United States Patent
Omoto et al.

(10) Patent No.: US 12,503,970 B1
(45) Date of Patent: Dec. 23, 2025

(54) EXHAUST STRUCTURE FOR ENGINE AND ENGINE

(71) Applicant: KAWASAKI MOTORS, LTD., Akashi (JP)

(72) Inventors: Keisuke Omoto, Akashi (JP); Matthew Colombo, Grand Rapids, MI (US); Jakob Daniel Cook, Grand Rapids, MI (US); Shuichi Yonaiyama, Akashi (JP); Kazuki Masui, Grand Rapids, MI (US)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/748,355

(22) Filed: Jun. 20, 2024

(51) Int. Cl.
 *F01N 13/18* (2010.01)
 *F01N 3/28* (2006.01)

(52) U.S. Cl.
 CPC ....... *F01N 13/1805* (2013.01); *F01N 3/2839* (2013.01)

(58) Field of Classification Search
 CPC .... F01N 3/2885; F01N 3/28; F01N 2590/021; F01N 13/08; F01N 13/0097; F01N 1/02; F01N 1/084; F01N 3/101; F01N 2470/02; F01N 2470/30; F01N 13/1888; F01N 2330/06; F01N 2240/20; F01N 1/00; F01N 3/2892
 See application file for complete search history.

(56) References Cited

U.S. PATENT DOCUMENTS

| | | | | |
|---|---|---|---|---|
| 4,094,644 A | * | 6/1978 | Wagner | F01N 1/08 422/181 |
| 10,196,948 B2 | * | 2/2019 | Masui | F01N 3/0205 |
| 2011/0030353 A1 | * | 2/2011 | Kamiya | F01N 3/0211 60/297 |
| 2022/0290600 A1 | * | 9/2022 | Yasoshina | F01N 3/0211 |

FOREIGN PATENT DOCUMENTS

| | | | | |
|---|---|---|---|---|
| JP | 09303140 A | * | 11/1997 | F01N 3/2867 |
| WO | 2022/180742 A1 | | 9/2022 | |

OTHER PUBLICATIONS

JP-09303140-A English Translation (Year: 1997).*

* cited by examiner

*Primary Examiner* — Anthony Ayala Delgado
(74) *Attorney, Agent, or Firm* — XSENSUS LLP

(57) ABSTRACT

An exhaust pipe connected to an engine body, the exhaust pipe into which an exhaust gas is introduced from the engine body, a catalyst body that purifies an exhaust gas, and a housing case that houses the catalyst body are included, and the housing case includes an inlet portion connected to a downstream end portion of the exhaust pipe, the inlet portion into which an exhaust gas is introduced from the exhaust pipe, an outlet portion that leads out an exhaust gas from the housing case to an outside, and an expansion chamber provided on a more upstream side than the catalyst body in a flow direction of an exhaust gas from the inlet portion toward the outlet portion and having a space defined inside, (Continued)

and a volume of the expansion chamber is larger than a volume of the catalyst body.

14 Claims, 7 Drawing Sheets

EXHAUST STRUCTURE FOR ENGINE AND ENGINE

FIELD OF INVENTION

The present disclosure relates to an exhaust structure for an engine and an engine.

BACKGROUND ART

As a type of exhaust structure for an engine having a catalyst, an engine described in WO 2022/180742 A1 is known. Such an engine is desirable to suppress progress of deterioration of the catalyst.

SUMMARY OF THE INVENTION

The present disclosure has been made in view of the above-described circumstance, and an object thereof is to provide an exhaust structure for an engine capable of suppressing the progress of deterioration of a catalyst.

In order to solve the above problem, an exhaust structure for an engine according to one aspect of the present disclosure includes: an exhaust pipe connected to an engine body, the exhaust pipe into which an exhaust gas is introduced from the engine body; a catalyst body that purifies an exhaust gas; and a housing case that houses the catalyst body, in which the housing case includes an inlet portion connected to a downstream end portion of the exhaust pipe, the inlet portion into which an exhaust gas is introduced from the exhaust pipe, an outlet portion that leads out an exhaust gas from the housing case to an outside, and an expansion chamber provided on a more upstream side than the catalyst body in a flow direction of an exhaust gas from the inlet portion toward the outlet portion and having a space defined inside, and a volume of the expansion chamber is larger than a volume of the catalyst body.

DETAILED DESCRIPTION

Hereinafter, an embodiment of an engine according to the present disclosure will be described with reference to the drawings.

Entire Configuration of Engine

Figure 1:
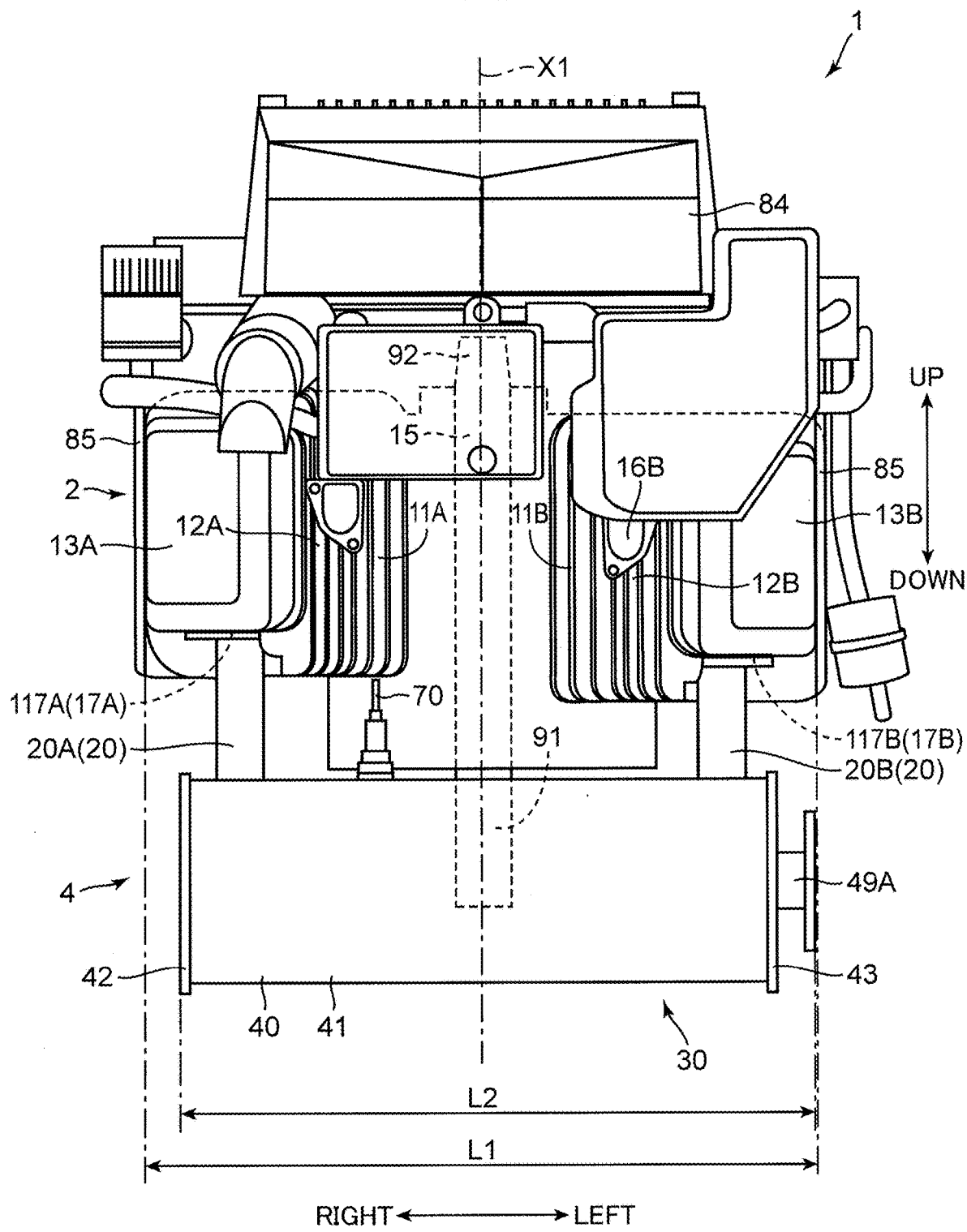
FIG. 1 is a schematic front view of an engine according to an embodiment of the present disclosure as viewed from the front.
Figure 2:
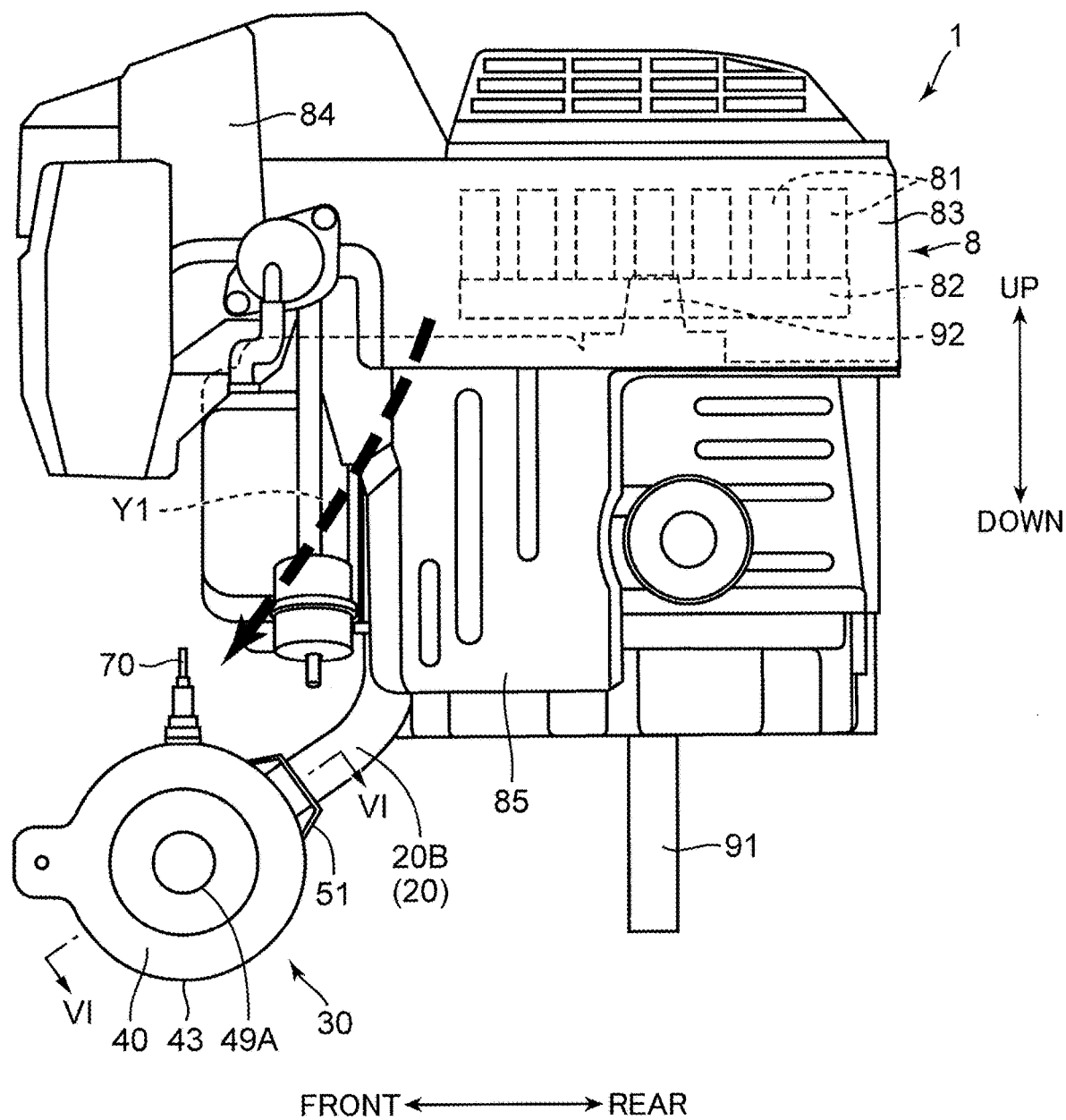
FIG. 2 is a schematic side view of the engine.
Figure 3:
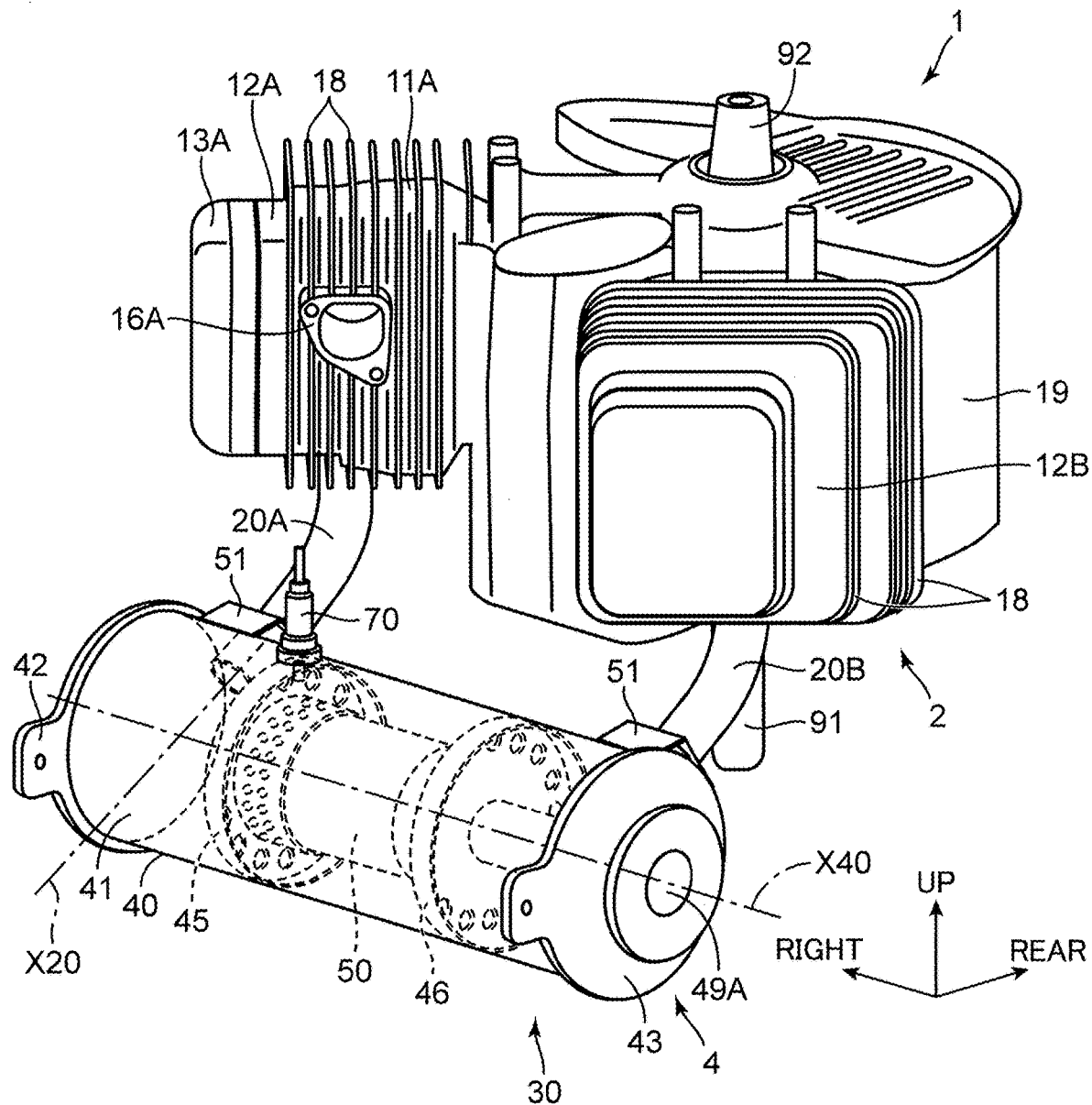
FIG. 3 is a schematic perspective view of an engine body and an exhaust system of the engine.
Figure 4:
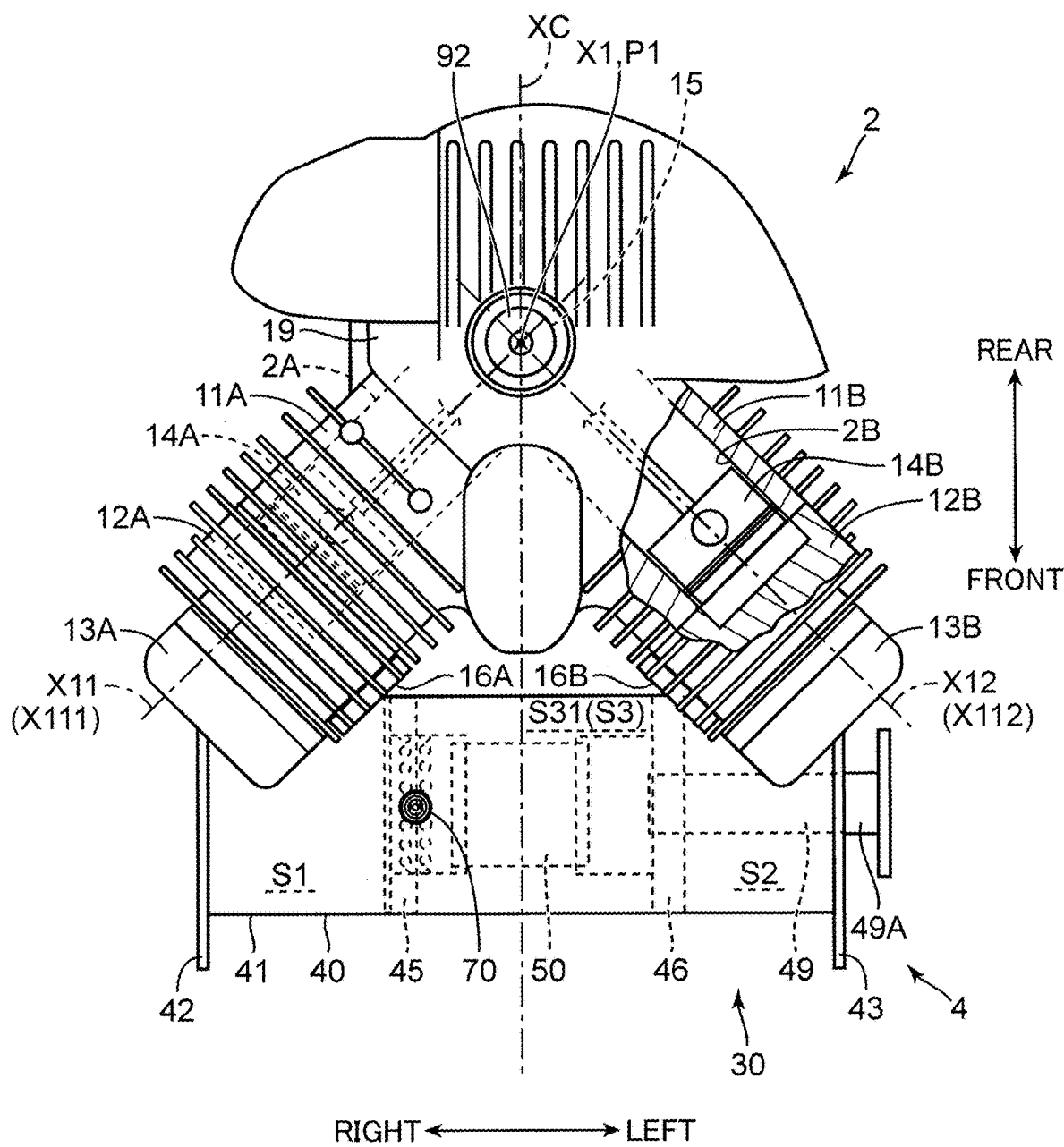
FIG. 4 is a schematic plan view of the engine body and the exhaust system.
Figure 5:
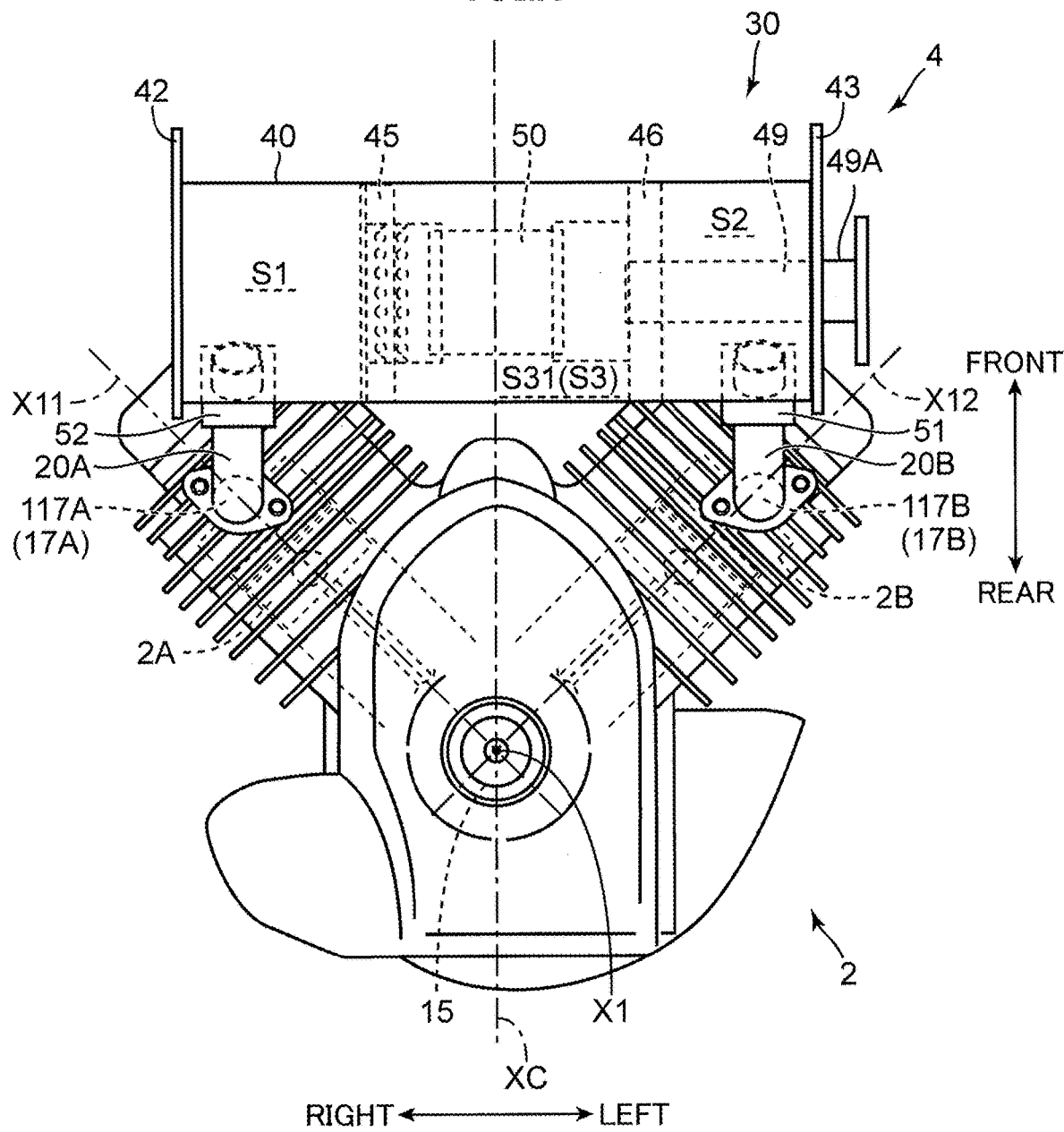
FIG. 5 is a schematic bottom view of the engine body and the exhaust system.

FIG. 1 is a schematic front view of an engine 1 according to an embodiment of the present disclosure. FIG. 2 is a schematic side view of the engine 1. An engine 1 of the present disclosure includes an engine body 2, an exhaust system 4, and a cooling fan 8. The engine 1 is mounted on a vehicle or the like. For example, the engine 1 is mounted on a riding type mower and is used as a traveling source of the mower and a driving source of the cutting blade. FIG. 3 is a schematic perspective view of the engine body 2 and the exhaust system 4. FIG. 4 is a schematic plan view of the engine body 2 and the exhaust system 4. FIG. 5 is a schematic bottom view of the engine body 2 and the exhaust system 4. FIG. 4 illustrates the engine body 2 with a part thereof broken. In FIGS. 3 to 5, a part of an internal structure of a catalyst built-in muffler 30 described later of the exhaust system 4 is indicated by a broken line.

The engine body 2 is a reciprocating engine. The engine body 2 is a so-called V-twin engine including two cylinders 2A and 2B. An engine may be required to have a purification function for purifying harmful components contained in exhaust gas. For example, the harmful component is assumed to be hydrocarbon, carbon monoxide, and nitrogen oxide.

The engine body 2 includes a pair of cylinder blocks 11A and 11B, a pair of cylinder heads 12A and 12B, and a pair of head covers 13A and 13B. The cylinder heads 12A and 12B are fastened to the cylinder blocks 11A and 11B, respectively. The head covers 13A and 13B are attached to the cylinder heads 12A and 12B, respectively.

One cylinder 2A and one cylinder 2B are formed in the two cylinder blocks 11A and 11B, respectively. An inner peripheral surface of each of the cylinders 2A and 2B has a cylindrical surface shape. The engine body 2 includes a first piston 14A. The first piston 14A reciprocates in the first cylinder 2A, which is one cylinder 2A, along a first cylinder axis line X11, which is an axis thereof. The engine body 2 includes a second piston 14B. The second piston 14B reciprocates in the second cylinder 2B, which is the other cylinder 2B, along a second cylinder axis line X12, which is an axis thereof. The engine body 2 includes a crankshaft 15. The crankshaft 15 is connected to both of the two pistons 14A and 14B. The crankshaft 15 is rotationally driven by the two pistons 14A and 14B. The engine body 2 includes a crankcase 19. The crankcase 19 is connected to the cylinder blocks 11A and 11B. The crankshaft 15 is housed inside the crankcase 19.

The crankshaft 15 extends in an up-down direction, that is, a vertical direction. A crankshaft line X1, which is a rotation center line of the crankshaft 15, extends in the up-down direction. The first cylinder axis line X11 and the second cylinder axis line X12 extend horizontally. As described above, the engine body 2 is used in a posture in which the crankshaft line X1 extends in the up-down direction and the cylinder axis lines X11 and X12 extend horizontally. In other words, the engine body 2 is designed on the premise that the engine body 2 is mounted on a work machine in a state where the crankshaft line X1 extends up-down. The engine 1 is provided with an oil pan that stores engine oil. The oil pan is disposed on one side in the direction along the crankshaft line X1 with respect to the engine body 2. In the present embodiment, the oil pan is disposed below the engine body 2.

When viewed along the crankshaft line X1, that is, when viewed along the up-down direction, the first cylinder axis line X11 and the second cylinder axis line X12 intersect so as to form a V shape. Specifically, as viewed along the up-down direction, the first cylinder axis line X11 and the second cylinder axis line X12 intersect each other. Of the first cylinder axis line X11, a line segment extending toward the first cylinder 2A from an intersection PI with the second cylinder axis line X12 as a base point is a first reference line X111. Of the second cylinder axis line X12, a line segment extending toward the second cylinder 2B from the intersection P1 as a base point is a second reference line X112. The first reference line X111 and the second reference line X112 form an angle of less than 180 degrees, and form a V shape. When viewed along the up-down direction, the intersection P1 is located at a point on the crankshaft line X1.

In the present embodiment, as viewed along the up-down direction, a center line XC dividing the entire engine body 2 into halves divides the angle formed by the first reference line X111 and the second reference line X112 into two equal parts. Hereinafter, a direction along this center line XC is called a front-rear direction. The cylinders 2A and 2B are separated from the crankshaft 15 in the front-rear direction. Hereinafter, the crankshaft 15 side with respect to each of the cylinders 2A and 2B is called a rear side, and the opposite side is called a front side. A direction orthogonal to the up-down direction and the front-back direction is called a left-right direction. Directions illustrated in each drawing represent the directions defined as described above. In each drawing, the cylinder located on the right side of the two cylinders 2A and 2B is illustrated as the first cylinder 2A, and the cylinder located on the left side is illustrated as the second cylinder 2B. Also in the following description, the cylinder located on the right side is treated as the first cylinder 2A, and the cylinder located on the left side is treated as the second cylinder 2B.

Intake ports 16A and 16B for introducing intake air into the cylinders 2A and 2B are formed in the cylinder heads 12A and 12B, respectively. The first intake port 16A corresponding to the first cylinder 2A opens on the left side surface of the first cylinder head 12A. The second intake port 16B corresponding to the second cylinder 2B opens on the right side surface of the second cylinder head 12B. Each of the intake ports 16A and 16B is connected to an intake system device such as an intake pipe, but illustration of the intake system device is omitted.

Exhaust ports 17A and 17B for leading out the exhaust gas generated in the cylinders 2A and 2B from the cylinders 2A and 2B are formed in the cylinder heads 12A and 12B, respectively. The downstream end portion of the first exhaust port 17A corresponding to the first cylinder 2A, that is, an outlet 117A of the first exhaust port 17A is open to the lower surface of the first cylinder head 12A. The downstream end portion of the second exhaust port 17B corresponding to the second cylinder 2B, that is, an outlet 117B of the second exhaust port 17B opens on the lower surface of the second cylinder head 12B. The first exhaust port 17A and the second exhaust port 17B are arranged in the left-right direction. When viewed along the up-down direction, the first exhaust port 17A and the second exhaust port 17B are formed at symmetrical positions about the center line XC. As described above, in the first embodiment, the port array direction, which is the arrangement direction of the first exhaust port 17A and the second exhaust port 17B, coincides with the left-right direction. In other words, in the description of the engine 1 according to the first embodiment, the port array direction is called a left-right direction.

The engine 1 includes a first output shaft 91 and a second output shaft 92 that are rotatable integrally with the crankshaft 15. The first output shaft 91 protrudes downward from the lower surface of the crankcase 19. The first output shaft 91 is connected to a wheel, a cutting blade, or the like, and rotates the wheel, the cutting blade, or the like. The second output shaft 92 protrudes upward from the upper surface of the crankcase 19.

The exhaust system 4 is a system that discharges the exhaust gas generated in each of the cylinders 2A and 2B into the atmosphere. The exhaust system 4 is connected to the engine body 2. The exhaust system 4 is provided with an exhaust pipe 20 and the catalyst built-in muffler 30. The exhaust pipe 20 and the catalyst built-in muffler 30 are components that define an exhaust passage through which exhaust gas flows. The exhaust pipe 20 and the catalyst built-in muffler 30 are provided in this order from the upstream side in the flow direction of the exhaust gas.

The engine body 2 is an air-cooled engine. The outer surfaces of the cylinder blocks 11A and 11B and the cylinder heads 12A and 12B are provided with a plurality of cooling fins 18.

The fan 8 sends air to the engine body 2 to cool the engine body 2. The fan 8 is disposed above the crankcase 19. The crankcase 19 constitutes a rear side part of the engine body 2, and the fan 8 is disposed above the rear side part of the engine body 2.

The fan 8 includes a fan body 82 including a plurality of blades 81, and a fan case 83 surrounding an outer periphery of the fan body 82. The fan body 82 is connected to the second output shaft 92. The fan body 82 is rotationally driven by the second output shaft 92. The fan 8 is a centrifugal fan. When the fan body 82 rotates, air is taken in from above the fan body 82 and discharged to the outer peripheral side of the fan body 82.

The fan case 83 extends to the front side relative to the fan body 82. The front of the fan case 83 is generally covered with a device 84 of an intake system or the like. The engine 1 is provided with covers 85 and 85. Each of the covers 85 and 85 extends downward from the vicinity of both left and right edges of the front part of the fan case 83. The covers 85 and 85 are disposed so as to cover both left and right sides of the engine body 2. With this configuration, the air released to the outer peripheral side of the fan body 82 is mainly guided obliquely forward and downward from the front portion of the fan body 82 as indicated by arrow Y1 in FIG. 2. As illustrated in FIG. 2, the front part of the engine body 2 including the cylinder blocks 11A and 11B and the cylinder heads 12A and 12B is disposed at a position obliquely forward and downward of the fan body 82. As a result, the cylinder blocks 11A and 11B and the cylinder heads 12A and 12B are cooled by the air released by the fan 8.

[Exhaust System]

Figure 6:
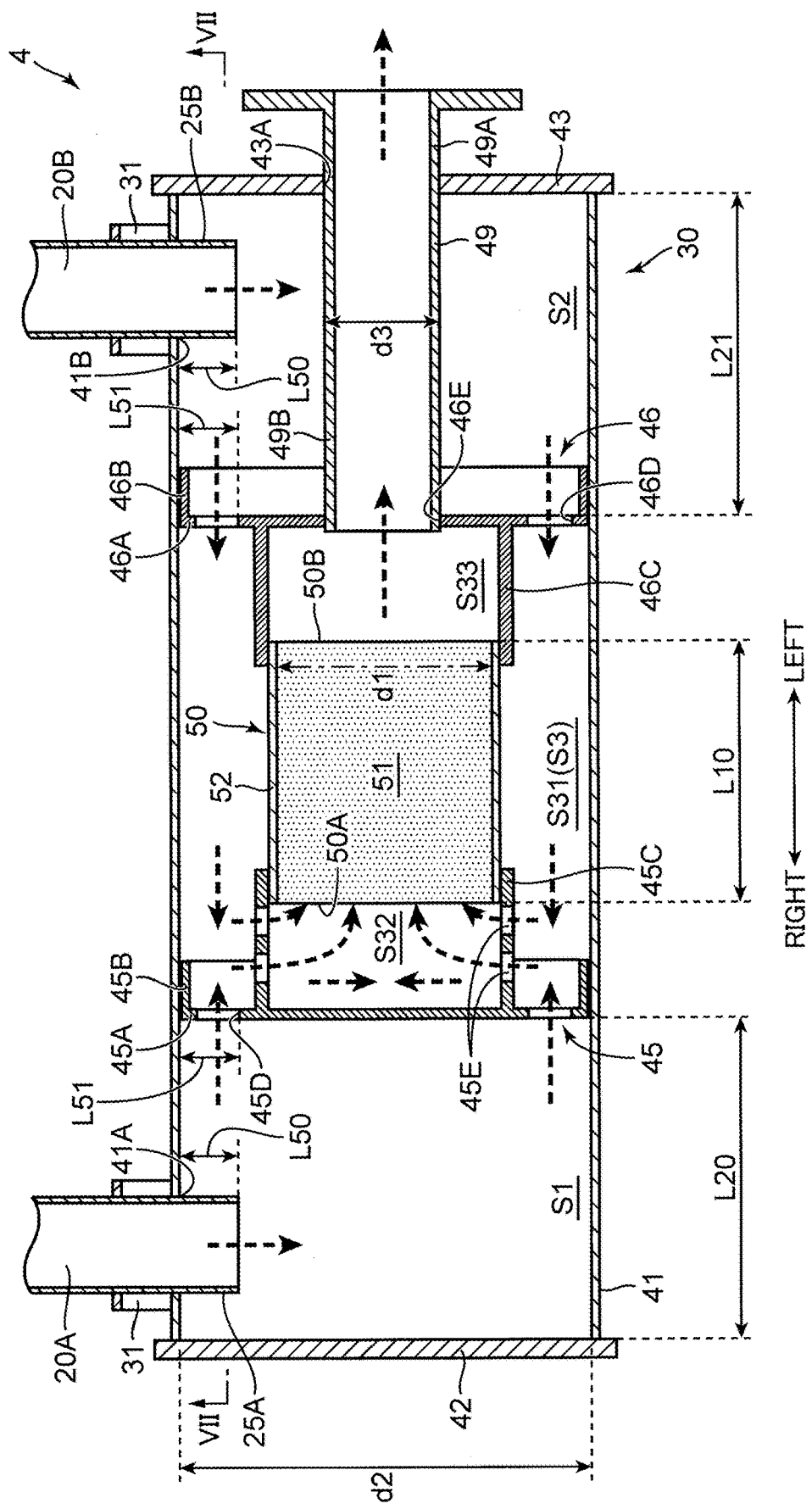
FIG. 6 is a cross-sectional view taken along line VI-VI of FIG. 2.

Hereinafter, a detailed configuration of the exhaust system 4 that is an exhaust structure for the engine according to the embodiment of the present disclosure will be described. FIG. 6 is a cross-sectional view taken along line VI-VI of FIG. 2. Hereinafter, the upstream side and the downstream side in the flow direction of the exhaust gas are simply called upstream side and downstream side as appropriate.

The exhaust pipe 20 is connected to the engine body 2. The exhaust gas discharged from the engine body 2 flows inside the exhaust pipe 20. The exhaust pipe 20 includes a first exhaust pipe 20A and a second exhaust pipe 20B each connected to the engine body 2. The first exhaust pipe 20A is fixed to the lower surface of the first cylinder head 12A. The second exhaust pipe 20B is fixed to the lower surface of the second cylinder head 12B.

The first exhaust pipe 20A is connected to the outlet 117A of the first exhaust port 17A. Exhaust gas generated in the first cylinder 2A is introduced into the first exhaust pipe 20A through the first exhaust port 17A.

The first exhaust pipe 20A extends from the outlet 117A of the first exhaust port 17A toward a position obliquely forward and downward with respect to the outlet 117A. When viewed along the up-down direction, the first exhaust pipe 20A extends straight in the front-rear direction. The second exhaust pipe 20B extends from the outlet 117B of the second exhaust port 17B toward a position obliquely forward and downward with respect to the outlet 117B. When viewed along the up-down direction, the second exhaust pipe 20B extends straight in the front-rear direction. In the present embodiment, both the first exhaust pipe 20A and the second exhaust pipe 20B are circular pipes. The inner diameter of the first exhaust pipe 20A and the inner diameter of the second exhaust pipe 20B are set to the same value.

The catalyst built-in muffler 30 incorporates a catalyst 51 as described later, and has a function of purifying exhaust gas. The catalyst built-in muffler 30 also has a function of reducing exhaust noise.

The catalyst built-in muffler 30 is disposed between the first reference line X111 and the second reference line X112. In the present embodiment, the catalyst built-in muffler 30 is disposed such that the substantially center in the left-right direction is located on the center line XC as viewed along the up-down direction. A dimension L2 in the left-right direction of the catalyst built-in muffler 30 is equal to or less than a dimension L1 in the left-right direction of the engine body 2. The catalyst built-in muffler 30 is disposed in a region between a right end and a left end of the engine body 2 in the left-right direction.

The catalyst built-in muffler 30 is disposed on a flow path of air sent from the fan 8. Specifically, the catalyst built-in muffler 30 is disposed at a front position of a lower portion of the engine body 2 that is a position obliquely forward and downward from a front portion of the fan body 82. As a result, the catalyst built-in muffler 30 receives the air sent from the fan 8 and is cooled by the air.

The catalyst built-in muffler 30 includes a housing case 40 constituting an outer shape thereof and a catalyst body 50. The catalyst body 50 is housed inside the housing case 40.

The catalyst body 50 has a tubular shape. Exhaust gas is introduced into the inside of the catalyst body 50 from an open end on one side in the axial direction thereof. The introduced exhaust gas is led out to the outside from the open end on the other side of the catalyst body 50. In the present embodiment, the catalyst body 50 has a cylindrical shape. The catalyst body 50 has an outer cylinder 52 having a cylindrical shape constituting the outer shape thereof. The catalyst 51 is supported on a carrier provided inside the outer cylinder 52. The catalyst 51 is, for example, a three-way catalyst. For example, the catalyst body 50 is formed in a honeycomb structure in which both axial ends are opened.

The housing case 40 has a bottomed cylindrical shape extending in the left-right direction. A space is defined inside the housing case 40. The housing case 40 includes a case body 41, a right bottom wall 42, and a left bottom wall 43. The case body 41 has a cylindrical shape extending in the left-right direction. A central axis X40 of the case body 41 extends in the left-right direction. The axial direction of the case body 41 and the housing case 40 coincides with the left-right direction. The right bottom wall 42 is attached to the right end portion of the case body 41. The left bottom wall 43 is attached to the left end portion of the case body 41. Each of the bottom walls 42 and 43 has a substantially disk shape. The bottom walls 42 and 43 are attached to the case body 41 so as to close the left and right openings of the case body 41.

In the case body 41, a first inlet portion 41A and a second inlet portion 41B for introducing exhaust gas into the housing case 40 are formed. These inlet portions 41A and 41B are through holes penetrating the outer peripheral surface of the case body 41. The first inlet portion 41A is formed in a rear part of the outer peripheral surface of the case body 41. The first inlet portion 41A is provided near the right end portion of the outer peripheral surface of the case body 41. The second inlet portion 41B is formed in a rear part of the outer peripheral surface of the case body 41. The second inlet portion 41B is provided near the left end portion of the outer peripheral surface of the case body 41.

A downstream end portion 25A of the first exhaust pipe 20A is inserted into the first inlet portion 41A, and these are connected. A downstream end portion 25B of the second exhaust pipe 20B is inserted into the second inlet portion 41B, and these are connected. In the present embodiment, the exhaust pipes 20A and 20B and the case body 41 are connected via a pair of left and right brackets 31 and 31 fixed to the outer peripheral surface of the case body 41. Hereinafter, the downstream end portion 25A of the first exhaust pipe 20A is appropriately called a first exhaust pipe end portion 25A. The downstream end portion 20B of the second exhaust pipe 25B is called a second exhaust pipe end portion 25B.

In the present embodiment, the first exhaust pipe end portion 25A is attached to the first inlet portion 41A in a state of protruding inward in the radial direction of the case body 41 from the inner peripheral surface of the case body 41. Similarly, the second exhaust pipe end portion 25B is attached to the second inlet portion 41B in a state of protruding inward in the radial direction of the case body 41 from the inner peripheral surface of the case body 41. Protrusion amounts L50 of the first exhaust pipe end portion 25A and the second exhaust pipe end portion 25B from the inner peripheral surface of the case body 41 is the same as each other.

A central axis X20 of the first exhaust pipe end portion 25A extends along the radial direction of the case body 41. The central axis X20 of the first exhaust pipe end portion 25A intersects the central axis X40 of the case body 41. Specifically, these central axes X20 and X40 are orthogonal to each other. Although not illustrated in detail, the central axis of the second exhaust pipe end portion 25B also extends along the radial direction of the case body 41. The central axis of the second exhaust pipe end portion 25B and the central axis X40 of the case body 41 are also orthogonal to each other.

The housing case 40 includes a first partition portion 45 and a second partition portion 46 provided inside thereof, and a communication pipe 49. The first partition portion 45 and the second partition portion 46 are separated from each other in the left-right direction. The first partition portion 45 and the second partition portion 46 are fixed to the case body 41.

The first partition portion 45 includes a first partition wall 45A orthogonal to the central axis X40 of the housing case 40. The second partition portion 46 includes a second partition wall 46A orthogonal to the central axis X40 of the housing case 40.

The first partition wall 45A and the second partition wall 46A have the same area as that of a cross-section orthogonal to the axial direction of the housing case 40. The first partition wall 45A and the second partition wall 46A define the inner space of the housing case 40 into three spaces of a first expansion chamber S1, a catalyst chamber S3, and a second expansion chamber S2 in the left-right direction. The first expansion chamber S1 is a space between the first partition portion 45 and the right bottom wall 42. The catalyst chamber S3 is a space between the first partition portion 45 and the second partition portion 46. The second expansion chamber S2 is a space between the second partition portion 46 and the left bottom wall 43. Note that the first expansion chamber S1 is located on the right side of the housing case 40, and the second expansion chamber S2 is located on the left side of the housing case 40. The catalyst chamber S3 is located between the first expansion chamber S1 and the second expansion chamber S2. In the present embodiment, the separation distance between the first partition wall 45A and the right bottom wall 42 and the separation distance between the second partition wall 46A and the left bottom wall 43 are the same in the left-right direction. The catalyst chamber S3 is provided at the center in the left-right direction of the housing case 40.

The first inlet portion 41A is provided in the first expansion chamber S1. The first inlet portion 41A is formed on the outer peripheral surface of the case body 41 that defines the first expansion chamber S1. The second inlet portion 41B is provided in the second expansion chamber S2. The second inlet portion 41B is formed on the outer peripheral surface of the case body 41 that defines the second expansion chamber S2.

The volume of the first expansion chamber S1 is larger than the volume of the catalyst body 50. The volume of the catalyst body 50 is a volume of a space formed inside the catalyst body 50 through which the exhaust gas can pass. The volume of the catalyst body 50 in the present embodiment approximates the volume of the catalyst body 50, and therefore the volume of the catalyst body 50 is specified as the volume of the catalyst body 50.

In the present embodiment, the volume of the first expansion chamber S1 is set to be 2 times or more and 10 times or less the volume of the catalyst body 50. Specifically, a volume V1 of the catalyst body 50 can be expressed as $V1 \approx d1 \times d1 \times \pi/4 \times L10$ using outer diameters d1 of the catalyst body 50 and the outer cylinder 52 and axial dimensions L10 of the catalyst body 50 and the outer cylinder 52. A volume V2 of the first expansion chamber S1 can be expressed as $V2 = d2 \times d2 \times \pi/4 \times L20$ using an inner diameter d2 of the case body 41 and a separation distance L20 in the left-right direction between the right bottom wall 42 and the first partition wall 45A. In the present embodiment, the volume V2 of the first expansion chamber S1 is set to be 2 times or more and 10 times or less the volume V1 of the catalyst body 50. Note that in the above and the following expressions, $\pi$ is a circular constant.

The volume of the second expansion chamber S2 is larger than the volume of the catalyst body 50. In the present embodiment, the volume of the second expansion chamber S2 is set to be 2 times or more and 10 times or less the volume of the catalyst body 50. Specifically, a volume V3 of the second expansion chamber S2 can be expressed as $V3 \approx (d2^2 - d3^2) \times \pi/4 \times L21$ using the inner diameter d2 of the case body 41, a separation distance L21 in the left-right direction between the left bottom wall 43 and the second partition wall 46A, and an outer diameter d3 of the communication pipe 49 described later. In the present embodiment, the volume V3 of the second expansion chamber S2 is set to be 2 times or more and 10 times or less the volume V1 of the catalyst body 50.

In the present embodiment, the volume V2 of the first expansion chamber S1 and the volume V3 of the second expansion chamber S2 are set to the same volume. In other words, the first partition portion 45 and the second partition portion 46 are disposed such that the volume relationship is achieved in a state where the communication pipe 49 is disposed in the second expansion chamber S2. Here, the volume V2 of the first expansion chamber S1 and the volume V3 of the second expansion chamber S2 are preferably set to be 2.5 times or more, more preferably 3 times or more and 5 times or less the volume of the catalyst body 50. Accordingly, in the present embodiment, the volume V2 of the first expansion chamber S1 and the volume V3 of the second expansion chamber S2 are set to about 4 times the volume V1 of the catalyst body 50.

The flow path area of the exhaust gas at the upstream end portion of the first expansion chamber S1 is set to be 2 times or more the flow path area of the exhaust gas at the downstream end portion of the first exhaust pipe 20A. Similarly, the flow path area of the exhaust gas at the upstream end portion of the second expansion chamber S2 is set to be 2 times or more the flow path area of the exhaust gas at the downstream end portion of the second exhaust pipe 20B. Hereinafter, the flow path area of the exhaust gas at the downstream end portion of the first exhaust pipe 20A is appropriately called a downstream end area of the first exhaust pipe 20A. Similarly, the flow path area of the exhaust gas at the downstream end portion of the second exhaust pipe 20B is appropriately called a downstream end area of the second exhaust pipe 20B. The flow path area of the exhaust gas at the downstream end portion of the first exhaust pipe 20A is the same as the opening area of the downstream open end of the first exhaust pipe 20A. The flow path area of the exhaust gas at the downstream end portion of the second exhaust pipe 20B is the same as the opening area of the downstream open end of the second exhaust pipe 20B.

Figure 7:
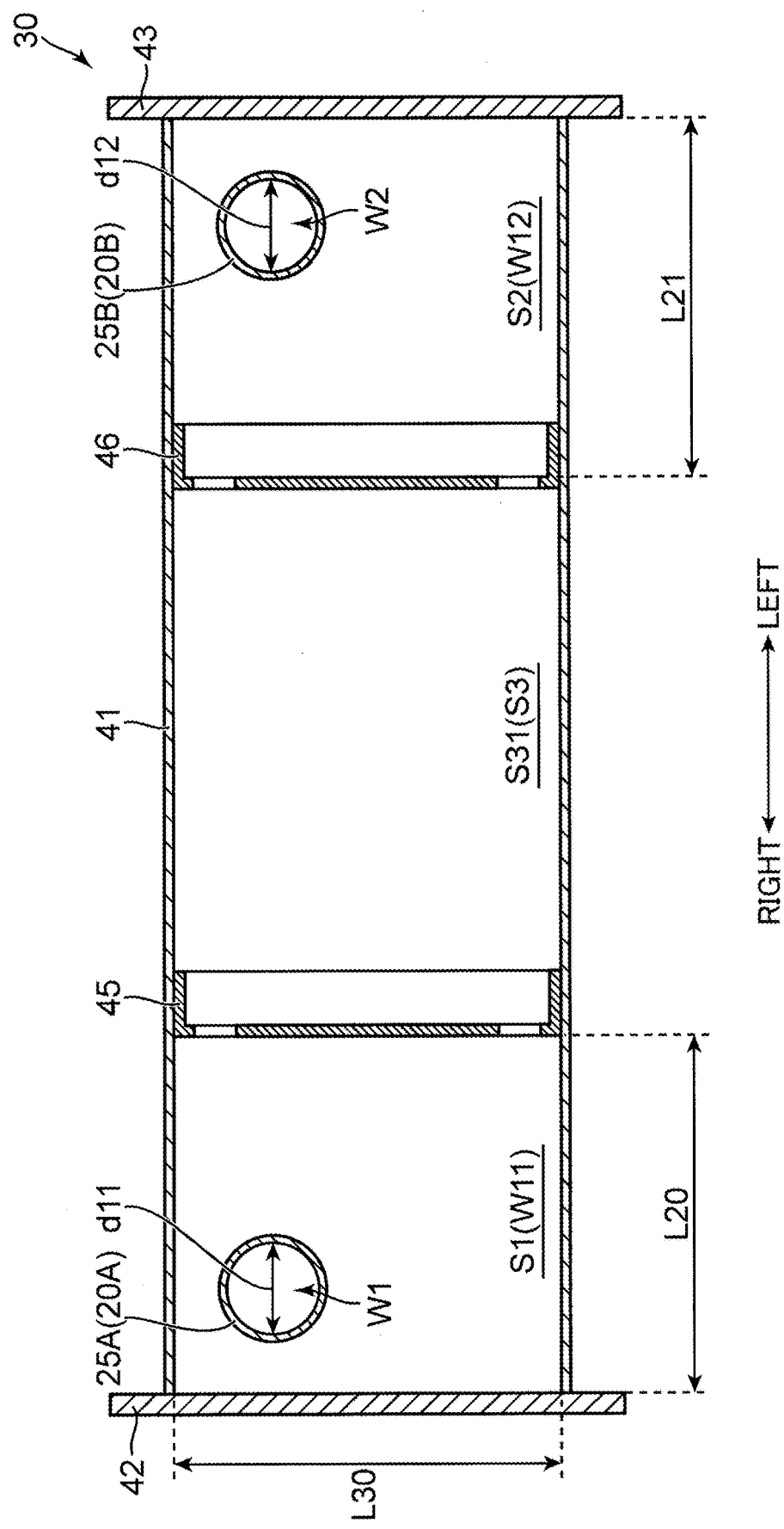
FIG. 7 is a cross-sectional view taken along line VII-VII of FIG. 6.

FIG. 7 is a cross-sectional view taken along line VII-VII of FIG. 6. A surface taken along line VII-VII in FIG. 6 is a surface along the downstream open ends of the first exhaust pipe 20A and the second exhaust pipe 20B. This surface is a surface orthogonal to the flow direction of the exhaust gas at the downstream end portions 25A and 25B of the first exhaust pipe 20A and the second exhaust pipe 20B. This surface is a surface orthogonal to the flow direction of the exhaust gas at the upstream end portions of the first expansion chamber S1 and the second expansion chamber S2. The flow path area of the exhaust gas at the upstream end portion of the first expansion chamber S1 is a cross-sectional area of the first expansion chamber S1 in the surface according to FIG. 7. Hereinafter, this area is appropriately called an upstream end area of the first expansion chamber S1. The flow path area of the exhaust gas at the upstream end portion of the second expansion chamber S2 is the cross-sectional area of the second expansion chamber S2 in the surface according to FIG. 7. Hereinafter, this area is appropriately called an upstream end area of the second expansion chamber S2.

A downstream end area W1 of the first exhaust pipe 20A is expressed as $W1 \approx d11 \times d11 \times \pi/4$ using an inner diameter d11 of the downstream end portion 25A of the first exhaust pipe 20A. A downstream end area W2 of the second exhaust pipe 20B is expressed as $W2 \approx d12 \times d12 \times \pi/4$ using an inner diameter d12 of the downstream end portion 25B of the second exhaust pipe 20B. As described above, the inner diameter d11 of the first exhaust pipe 20A and the inner diameter d12 of the second exhaust pipe 20B are the same. The downstream end area W1 of the first exhaust pipe 20A and the downstream end area W2 of the second exhaust pipe 20B are the same. An upstream end area W11 of the first expansion chamber S1 is expressed as $W11 \approx L30 \times L20$ using a dimension L30 in the radial direction of the case body 41 in the cross-section illustrated in FIG. 7. An upstream end area W12 of the second expansion chamber S2 is expressed as $W12 \approx L30 \times L21$. As described above, in the present embodiment, the relationship between the downstream end area W1 of the first exhaust pipe 20A and the upstream end area W11 of the first expansion chamber S1 is $W11 \geq 2 \times W1$.

The relationship between the downstream end area W2 of the second exhaust pipe 20B and the upstream end area W12 of the second expansion chamber S2 is W12≥2×W2.

The first partition portion 45 has a first outer peripheral wall 45B. The first outer peripheral wall 45B extends leftward from the outer peripheral edge of the first partition wall 45A. The first outer peripheral wall 45B is joined to the inner peripheral surface of the case body 41 by welding or the like. The second partition portion 46 has a second outer peripheral wall 46B. The second outer peripheral wall 46B extends leftward from the outer peripheral edge of the second partition wall 46A. The second outer peripheral wall 46B is joined to the inner peripheral surface of the case body 41 by welding or the like.

The first partition portion 45 has a first surrounding wall 45C. The first surrounding wall 45C has a cylindrical shape extending along the left-right direction. The first surrounding wall 45C protrudes leftward from the left side surface of the first partition wall 45A. The central axis of the first surrounding wall 45C and the central axis of the case body 41 substantially coincide with each other. The first surrounding wall 45C is disposed at a position separated from the inner peripheral surface of the case body 41 toward the inner peripheral side. The first partition wall 45A, the first outer peripheral wall 45B, and the first surrounding wall 45C are integrally formed with one another.

The second partition portion 46 has a second surrounding wall 46C. The second surrounding wall 46C has a cylindrical shape extending along the left-right direction. The second surrounding wall 46C protrudes rightward from the right side surface of the second partition wall 46A. The central axis of the second surrounding wall 46C and the central axis of the case body 41 substantially coincide with each other. The second surrounding wall 46C is disposed at a position separated from the inner peripheral surface of the case body 41 toward the inner peripheral side. The second partition wall 46A, the second outer peripheral wall 46B, and the second surrounding wall 46C are integrally formed with one another. The second surrounding wall 46C and the first surrounding wall 45C are separated from each other in the left-right direction. The first surrounding wall 45C and the second surrounding wall 46C correspond to the "surrounding wall" in the present disclosure.

The catalyst body 50 is housed in the catalyst chamber S3. The catalyst body 50 is disposed at the center of the catalyst chamber S3 and the housing case 40 in the left-right direction. As illustrated in FIG. 4 and the like, the catalyst chamber S3 and the catalyst body 50 are positioned on the center line XC as viewed along the up-down direction.

The catalyst body 50 is supported by the first surrounding wall 45C and the second surrounding wall 46C in a posture extending across the first surrounding wall 45C and the second surrounding wall 46C.

The catalyst body 50 is disposed in the catalyst chamber S3 in a posture extending along the left-right direction, that is, a posture in which the axial direction thereof coincides with the left-right direction. In the present embodiment, the inner diameters of the first surrounding wall 45C and the second surrounding wall 46C are the same. The outer diameter of the catalyst body 50 is the same as the inner diameters of the first surrounding wall 45C and the second surrounding wall 46C. The right end portion of the catalyst body 50 is inserted inside the first surrounding wall 45C. The left end portion of the catalyst body 50 is inserted inside the second surrounding wall 46C.

The catalyst body 50 is separated leftward from the first partition wall 45A. As a result, a space is defined by the first partition wall 45A, the inner peripheral surfaces of the first surrounding wall 45C, and an open end 50A on the right side of the catalyst body 50. Hereinafter, this space is appropriately called a first catalyst chamber S32.

The catalyst body 50 is separated rightward from the second partition wall 46A. As a result, a space is defined by the second partition wall 46A, the inner peripheral surfaces of the second surrounding wall 46C, and an open end 50B on the left side of the catalyst body 50. Hereinafter, this space is appropriately called a second catalyst chamber S33.

An outer peripheral chamber S31 is defined on the outer peripheral side of the catalyst chamber S3. The outer peripheral chamber S31 is defined by the outer peripheral surface of the surrounding walls 45C and 46C and the catalyst body 50, the inner peripheral surface of the housing case 40, and the partition walls 45A and 46A.

The exhaust system 4 includes an exhaust gas sensor 70 for detecting the property of the exhaust gas. The exhaust gas sensor 70 is, for example, an O2 sensor that detects the oxygen concentration of the exhaust gas. Specifically, the O2 sensor outputs, as a detection result, whether the exhaust gas is combusted at an ideal air-fuel ratio from the property of the exhaust gas. Note that the exhaust gas sensor 70 is not limited to one that detects the oxygen concentration of the exhaust gas. For example, the exhaust gas sensor 70 may detect an exhaust temperature or the like. The exhaust gas sensor 70 is attached to the case body 41. The tip of the exhaust gas sensor 70 faces the inside of the outer peripheral chamber S31 and is attached to the case body 41 in a posture protruding upward from the outer peripheral surface of the case body 41. In the present embodiment, the exhaust gas sensor 70 is disposed between the left side surfaces of the head cover 13A and the cylinder head 12A of the first cylinder 2A and the right side surfaces of the head cover 13B and the cylinder head 12B of the second cylinder 2B in the left-right direction. As described later, the exhaust gas flowing from the first expansion chamber S1 into the outer peripheral chamber S31 and the exhaust gas flowing from the second expansion chamber S2 into the outer peripheral chamber S31 merge in the outer peripheral chamber S31. In the present embodiment, the exhaust gas sensor 70 is attached so as to face the vicinity of the merging point of the exhaust gases.

In the first partition wall 45A, a first communication hole 45D penetrating the front and back sides in the left-right direction is formed. The first communication hole 45D causes the first expansion chamber S1 and the outer peripheral chamber S31 to communicate with each other. A plurality of the first communication holes 45D are formed in a ring-shaped region of the first partition wall 45A except for a region facing the open end 50A on the right side of the catalyst body 50. The plurality of first communication holes 45D are provided at intervals in the circumferential direction of the housing case 40. In the present embodiment, the plurality of first communication holes 45D are formed at equal intervals over the entire circumference of the ring-shaped region. The hole diameter of the first communication hole 45D is smaller than the diameter of the first partition wall 45A, and the hole diameter of the first communication hole 45D is smaller than the flow path area in the left-right direction of the exhaust gas in the first expansion chamber S1.

In the first surrounding wall 45C, a plurality of introduction holes 45E penetrating the front and back sides thereof in the radial direction of the housing case 40 are formed. In the present embodiment, the hole diameter of the introduction hole 45E is smaller than the hole diameter of the first communication hole 45D. The introduction hole 45E causes the outer peripheral chamber S31 and the first catalyst chamber S32 to communicate with each other. A plurality of the introduction holes 45E are provided at intervals over the entire circumference of the first surrounding wall 45C in the circumferential direction of the housing case 40. The plurality of introduction holes 45E are provided at intervals in the left-right direction. In the present embodiment, two rows of the introduction holes 45E are provided in the left-right direction. In the present embodiment, the number of the introduction holes 45E is larger than the number of the first communication holes 45D. As illustrated in FIG. 6, the introduction hole 45E is formed at a position spaced rightward from the right end surface of the catalyst body 50 in the left-right direction.

In the second partition wall 46A, a second communication hole 46D penetrating the front and back sides in the left-right direction is formed. The second communication hole 46D causes the second expansion chamber S2 and the outer peripheral chamber S31 to communicate with each other. A plurality of the second communication holes 46D are formed in a ring-shaped region of the second partition wall 46A except for a region facing the open end 50B on the left side of the catalyst body 50. The plurality of second communication holes 46D are provided at intervals in the circumferential direction of the housing case 40. In the present embodiment, the plurality of second communication holes 46D are formed at equal intervals over the entire circumference of the ring-shaped region. The hole diameter of the second communication hole 46D is smaller than the diameter of the second partition wall 46A, and the hole diameter of the second communication hole 46D is smaller than the flow path area in the left-right direction of the exhaust gas in the second expansion chamber S2. The first communication hole 45D and the second communication hole 46D correspond to the "communication holes" in the present disclosure.

As illustrated in FIG. 6, in the radial direction of the housing case 40, the distance between the inner end of the second communication hole 46D and the inner peripheral surface of the case body 41 is set to be equal to the distance between the inner end of the first communication hole 45D and the inner peripheral surface of the case body 41. A distance L51 between these communication holes 45D and 46D and the inner peripheral surface of the case body 41 is set to a dimension equal to or greater than the protrusion amount L50 from the inner peripheral surface of the case body 41 of the first exhaust pipe end portion 25A and the second exhaust pipe end portion 25B. In the example of FIG. 6, the distance L51 and the protrusion amount L50 are set to the same dimension.

Furthermore, in the second partition wall 46A, a first through hole 46E penetrating the front and back sides thereof in the left-right direction is formed. The first through hole 46E is formed in a part of the second partition wall 46A surrounded by the second surrounding wall 46C.

In the left bottom wall 43, a second through hole 43A penetrating the front and back sides in the left-right direction is formed. Both the first through hole 46E and the second through hole 43A are round holes whose central axis is the central axis of the housing case 40. The hole diameters of the first through hole 46E and the second through hole 43A are the same.

The communication pipe 49 has a cylindrical shape extending in the left-right direction. The central axis of the communication pipe 49 extends in the left-right direction. The outer diameter of the communication pipe 49 is the same as the inner diameters of the first through hole 46E and the second through hole 43A.

The communication pipe 49 is supported by the first through hole 46E and the second through hole 43A in a state of being inserted into them. The communication pipe 49 is inserted into the first through hole 46E in a state of protruding slightly rightward from the second partition wall 46A. The right end of the communication pipe 49 opens into the second catalyst chamber S33, and the inner space of the communication pipe 49 communicates with the second catalyst chamber S33. As a result, the communication pipe 49 communicates with the open end 50B on the left side of the catalyst body 50, that is, the left end portion via the second catalyst chamber S33.

The communication pipe 49 is inserted into the second through hole 43A in a state of protruding leftward from the left bottom wall 43. The left end of the second through hole 43A is opened to the outside of the housing case 40. As described later, the exhaust gas in the housing case 40 is led out from a left end portion 49A of the communication pipe 49 to the outside of the housing case 40. As described above, in the present embodiment, the left end portion 49A of the communication pipe 49 functions as an outlet portion that leads out the exhaust gas from the housing case 40 to the outside. A part of the communication pipe 49 excluding the left end portion 49A functions as a lead-out pipe 49B that causes the outlet portion for leading out the exhaust gas from the housing case 40 to the outside and the left end portion of the catalyst body 50 to communicate with each other.

In the catalyst built-in muffler 30 configured as described above, the exhaust gas flows as indicated by an arrow indicated by a broken line in FIG. 6.

The exhaust gas discharged from the first cylinder 2A and introduced into the first exhaust pipe 20A flows into the first expansion chamber S1 from the first exhaust pipe end portion 25A. Here, the volume of the first expansion chamber S1 is larger than the volume of the catalyst body 50, and is a relatively large volume. The upstream end area W11 of the first expansion chamber S1, which is a flow path area W11 of the exhaust gas at the upstream end portion of the first expansion chamber S1, is set to be 2 times or more the downstream end area W1 of the first exhaust pipe 20A, which is the flow path area W1 of the exhaust gas at the downstream end portion of the first exhaust pipe end portion 25A. As a result, upon flowing into the first expansion chamber S1, the exhaust gas expands, and the pressure, the flow velocity, and the temperature thereof decrease.

The exhaust gas flowing into the first expansion chamber S1 flows into the outer peripheral chamber S31 through the first communication hole 45D. Here, the central axis X20 of the first exhaust pipe end portion 25A is orthogonal to the central axis X40 of the housing case 40 and extends along the radial direction of the housing case 40. On the other hand, the first communication hole 45D extends in the left-right direction, that is, along the central axis X40 of the housing case 40. As a result, the flow of the exhaust gas is deflected in the first expansion chamber S1. Specifically, the orientation of the exhaust gas introduced from the first exhaust pipe end portion 25A into the first expansion chamber S1 along the radial direction of the housing case 40 is changed to the orientation along the axial direction of the housing case 40. In the first expansion chamber S1, part of the exhaust gas collides with the inner surface of the first expansion chamber S1.

The cross-sectional area of the first communication hole 45D in the plane orthogonal to the axial direction of the housing case 40, that is, the opening area of the first communication hole 45D is smaller than the cross-sectional area of the first expansion chamber S1. Therefore, the exhaust gas contracts when passing through the first communication hole 45D. On the other hand, the cross-sectional area of the outer peripheral chamber S31 in the plane orthogonal to the axial direction of the housing case 40 is larger than the opening area of the first communication hole 45D. As a result, the exhaust gas flowing into the outer peripheral chamber S31 through the first communication hole 45D expands.

The exhaust gas discharged from the second cylinder 2B and introduced into the second exhaust pipe 20B flows into the second expansion chamber S2 from the second exhaust pipe end portion 25B. Here, the volume of the second expansion chamber S2 is larger than the volume of the catalyst body 50, and is a relatively large volume. The upstream end area W12 of the second expansion chamber S2, which is a flow path area W12 of the exhaust gas at the upstream end portion of the second expansion chamber S2, is set to be 2 times or more the downstream end area W2 of the second exhaust pipe 20B, which is the flow path area W2 of the exhaust gas at the downstream end portion of the second exhaust pipe 20B. As a result, upon flowing into the second expansion chamber S2, the exhaust gas expands, and the pressure, the flow velocity, and the temperature thereof decrease.

The exhaust gas flowing into the second expansion chamber S2 flows into the outer peripheral chamber S31 through the second communication hole 46D.

Here, the central axis of the second exhaust pipe end portion 25B is orthogonal to the central axis X40 of the housing case 40 and extends along the radial direction of the housing case 40. On the other hand, the second communication hole 46D extends in the left-right direction, that is, along the central axis X40 of the housing case 40. As a result, the flow of the exhaust gas is deflected in the second expansion chamber S2. Specifically, the orientation of the exhaust gas introduced from the second exhaust pipe end portion 25B into the second expansion chamber S2 along the radial direction of the housing case 40 is changed to the orientation along the axial direction of the housing case 40. In the second expansion chamber S2, part of the exhaust gas collides with the inner surface of the second expansion chamber S2.

The cross-sectional area of the second communication hole 46D in the plane orthogonal to the axial direction of the housing case 40, that is, the opening area of the second communication hole 46D is smaller than the cross-sectional area of the second expansion chamber S2. Therefore, the exhaust gas contracts when passing through the second communication hole 46D. On the other hand, the cross-sectional area of the outer peripheral chamber S31 in the plane orthogonal to the axial direction of the housing case 40 is larger than the opening area of the second communication hole 46D. As a result, the exhaust gas flowing into the outer peripheral chamber S31 through the second communication hole 46D expands.

As described above, the exhaust gas led out from the first expansion chamber S1 and the exhaust gas led out from the second expansion chamber S2 flow into the outer peripheral chamber S31. As a result, the exhaust gases led out from the expansion chambers S1 and S2 merge while colliding in the outer peripheral chamber S31. Part of the exhaust gas collides with the inner surface of the outer peripheral chamber S31. Specifically, as described later, the exhaust gas flowing into the outer peripheral chamber S31 then flows into the first catalyst chamber S32 through the introduction hole 45E. As a result, the exhaust gases led out from the expansion chambers S1 and S2 merge in the vicinity of the introduction hole 45E.

Here, as described above, the exhaust gas sensor 70 is disposed near the merging point of the exhaust gases flowing into the outer peripheral chamber S31 from the expansion chambers S1 and S2. Correspondingly, in the present embodiment, the exhaust gas sensor 70 is attached to the case body 41 such that the tip of the exhaust gas sensor 70 faces the vicinity of the introduction hole 45E.

The exhaust gas flowing into the outer peripheral chamber S31 flows into the first catalyst chamber S32 through the introduction hole 45E.

Here, the first communication hole 45D is a hole penetrating the first partition wall 45A in the axial direction of the housing case 40. The second communication hole 46D is a hole penetrating the second partition wall 46A in the axial direction of the housing case 40. On the other hand, the introduction hole 45E is a hole penetrating the first surrounding wall 45C in the radial direction of the housing case 40. As a result, the flow of the exhaust gas is deflected on the way toward the outer peripheral chamber S31. Specifically, the orientation of the exhaust gas is changed from the orientation along the axial direction of the housing case 40 to the orientation along the radial direction of the housing case 40.

The opening area of the introduction hole 45E is smaller than the cross-sectional area of the outer peripheral chamber S31 on the plane orthogonal to the axial direction of the housing case 40, that is, the flow path area of the exhaust gas in the outer peripheral chamber S31. Therefore, the exhaust gas contracts when passing through the introduction hole 45E. On the other hand, the area of the outer peripheral surface of the first catalyst chamber S32 is larger than the opening area of the introduction hole 45E. As a result, the exhaust gas flowing into the first catalyst chamber S32 through the introduction hole 45E expands.

As described above, the plurality of introduction holes 45E are provided over the entire circumference of the first surrounding wall 45C in the circumferential direction of the housing case 40. As a result, the exhaust gas flowing into the first catalyst chamber S32 through the introduction holes 45E located on the opposite sides to each other in the radial direction of the housing case 40 collides in the first catalyst chamber S32. The exhaust gas also collides with the inner surface of the first catalyst chamber S32.

The exhaust gas flowing into the first catalyst chamber S32 flows into the inside of the catalyst body 50 from the open end 50A on the right side of the catalyst body 50. As described above, the introduction hole 45E is a hole penetrating the first surrounding wall 45C in the radial direction of the housing case 40. On the other hand, the open end 50A on the right side of the catalyst body 50 opens to the right, that is, one side in the axial direction of the housing case 40. As a result, the flow of the exhaust gas is deflected in the first catalyst chamber S32. Specifically, the orientation of the exhaust gas is changed from the orientation along the radial direction of the housing case 40 to the orientation along the axial direction of the housing case 40.

The exhaust gas flowing into the catalyst body 50 passes through the catalyst body 50 and flows into the second catalyst chamber S33. The exhaust gas flowing into the second catalyst chamber S33 is introduced into the communication pipe 49, and is led out from the left end portion 49A of the communication pipe 49 to the outside of the housing case 40, that is, the atmosphere.

As described above, in the present embodiment, the exhaust gas expands by being introduced into the first expansion chamber S1 and the second expansion chamber S2, and the temperature thereof decreases. The orientation of the exhaust gas is changed a plurality of times while passing through the housing case 40. Furthermore, while passing through the housing case 40, the exhaust gas repeats expanding and contracting, and at the same time, collision between the exhaust gases and collision between the exhaust gas and each inner surface occur, and exhaust energy is consumed. Therefore, before flowing into the catalyst body 50, the exhaust gas has the flow velocity and the pressure reduced in addition to the temperature thereof. That is, the exhaust gas lower in flow velocity and temperature than the exhaust gas in the exhaust pipes 20A and 20B is introduced into the catalyst body 50. The exhaust noise when being discharged from the housing case 40 is reduced.

[Actions]

As described above, in the exhaust structure for the engine 1 and the engine 1 according to the present embodiment, the first expansion chamber S1 and the second expansion chamber S2 having a volume larger than the volume of the catalyst body 50 are provided at positions on the upstream side of the catalyst body 50 in the flow direction of the exhaust gas, and the exhaust gas having passed through the first exhaust pipe 20A and the second exhaust pipe 20B is introduced into the catalyst body 50 after expanding and being cooled in the first expansion chamber S1 and the second expansion chamber S2. Therefore, it is possible to suppress the progress of deterioration of the catalyst body 50 due to the high temperature of the exhaust gas flowing into the catalyst body 50.

In particular, since the volume of each of the expansion chambers S1 and S2 is set to be as large as 2 times or more the volume of the catalyst body 50, the temperature of the exhaust gas can be reduced to such an extent that deterioration of the catalyst body 50 can be suppressed. However, if the volume of each of the expansion chambers S1 and S2 is excessively large, the temperature of the exhaust gas may be excessively lowered to fall below the catalyst activation temperature, and furthermore, the catalyst performance may be lowered. On the other hand, in the present embodiment, since the volume of each of the expansion chambers S1 and S2 is set to be 10 times or less the catalyst body 50, the catalyst performance of the catalyst body 50 can be improved while avoiding an increase in size of the catalyst built-in muffler 30.

In the present embodiment, the flow path area of the exhaust gas at the upstream end portion of each of the expansion chambers S1 and S2 is set to be 2 times or more the flow path area of the exhaust gas at the downstream end portion of the corresponding exhaust pipes 20A and 20B. Therefore, immediately after flowing into each of the expansion chambers S1 and S2, the exhaust gas can be expanded to lower the temperature thereof, and the temperature of the exhaust gas flowing into the catalyst body 50 can be reduced.

In the present embodiment, the central axis X20 of each of the exhaust pipe end portions 25A and 25B intersects the central axis X40 of the case body 41. Therefore, the exhaust gas flowing into each of the expansion chambers S1 and S2 through the exhaust pipe end portions 25A and 25B can collide with the inner peripheral surface of each of the expansion chambers S1 and S2, and the energy of the exhaust gas can be reduced by this collision. Therefore, it is possible to reduce the flow velocity of the exhaust gas and prevent the catalyst 51 from being peeled off by the exhaust gas. That is, the catalyst body 50 can be protected. Temperature decrease of the exhaust gas flowing into the catalyst body 50 can be promoted.

In the present embodiment, the first exhaust pipe end portion 25A and the second exhaust pipe end portion 25B protrude from the inner peripheral surface of the case body 41 to the inside of the housing case 40. Therefore, the exhaust gas flowing into the expansion chambers S1 and S2 from the exhaust pipe end portions 25A and 25B can be guided to the vicinity of the centers of the expansion chambers S1 and S2. That is, it is possible to suppress the exhaust gas from immediately flowing into the outer peripheral chamber S31 through the communication holes 45D and 46D. Therefore, the exhaust gas can be expanded in each of the expansion chambers S1 and S2, and the collision between the exhaust gas and the inner surface of each of the expansion chambers S1 and S2 can be promoted. In particular, the distance L51 between each of the communication holes 45D and 46D and the inner peripheral surface of the case body 41 is set to a dimension equal to or greater than the protrusion amount L50 of each of the exhaust pipe end portions 25A and 25B from the inner peripheral surface of the case body 41. Therefore, it is possible to suppress the exhaust gas flowing into the expansion chambers S1 and S2 through the exhaust pipe end portions 25A and 25B from immediately flowing into the outer peripheral chamber S31 through the communication holes 45D and 46D.

In the present embodiment, the outer peripheral chamber S31 is defined on the outer periphery of the catalyst chamber S3 housing the catalyst body 50. Then, the exhaust gas flows into the catalyst body 50 after being introduced into the outer peripheral chamber S31 from each of the expansion chambers S1 and S2. Therefore, by causing the exhaust gases to collide with each other in the outer peripheral chamber S31, it is possible to reduce the energy of the exhaust gas before flowing into the catalyst body 50.

In the present embodiment, the exhaust gases led out from the exhaust pipes 20A and 20B flow into the catalyst body 50 after passing through the communication holes 45D and 46D and the introduction hole 45E. Therefore, expansion and contraction of the exhaust gas can be repeated before the exhaust gas flows into the catalyst body 50. Therefore, the energy of the exhaust gas can be lost before the exhaust gas flows into the catalyst body 50.

As described above, in the present embodiment, the exhaust gas is configured to collide in the first catalyst chamber S32. Therefore, this can also cause the energy of the exhaust gas to be lost.

In the present embodiment, the flow of the exhaust gas is deflected a plurality of times until the exhaust gas flows into the catalyst body 50 inside the housing case 40. Therefore, the energy of the exhaust gas can be further reduced before the exhaust gas flows into the catalyst body 50.

In the present embodiment, the plurality of introduction holes 45E are formed in the first surrounding wall 45C over the entire circumference of the first surrounding wall 45C. The plurality of introduction holes 45E are formed also in the left-right direction. Therefore, the exhaust gas can be introduced into the first catalyst chamber S32 while being dispersed. In particular, in the present embodiment, since the introduction holes 45E are larger in number than the first communication holes 45D, the exhaust gas is more dispersed when passing through the introduction hole 45E. By dispersing the exhaust gas in this manner, it is possible to prevent the position where the exhaust gas flows from the first catalyst chamber S32 into the catalyst body 50 from being deviated. This deviation is prevented, whereby the exhaust performance can be enhanced and the deterioration of the catalyst 51 can be suppressed.

In the present embodiment, since the introduction hole 45E is formed at a position separated to the right side from the right end surface of the catalyst body 50 in the left-right direction, the exhaust gas having passed through the introduction hole 45E can be dispersed also on the outer peripheral side of the catalyst body 50.

In the present embodiment, the catalyst body 50 is positioned on the center line XC as viewed along the up-down direction. As described above, the center line XC is a line that equally divides the angle formed by the first cylinder axis line X11 and the second cylinder axis line X12, and by the above arrangement, the catalyst body 50 is disposed at a position where the catalyst body is substantially equidistant to both the first cylinder 2A and the second cylinder 2B. That is, the catalyst body 50 is disposed at a position separated from both the first cylinder 2A and the second cylinder by substantially the same distance. Therefore, the heat that the catalyst body 50 receives from the first cylinder 2A and the second cylinder 2B can be suppressed to be small, and the progress of the deterioration of the catalyst body 50 can be suppressed.

In the present embodiment, the catalyst built-in muffler 30 and thus the housing case 40 are disposed in the flow path of air sent from the fan 8. Therefore, the housing case 40 and thus the catalyst body 50 can be cooled by the air from the fan, and the temperature of the catalyst body 50 can be prevented from becoming excessively high.

In the present embodiment, the catalyst body 50 is disposed in the catalyst chamber S3 defined between the first expansion chamber S1 and the second expansion chamber S2 in the left-right direction, that is, the longitudinal direction of the housing case 40. Therefore, the weight balance in the longitudinal direction of the housing case 40 can be improved.

In the present embodiment, the dimension in the longitudinal direction of the housing case 40, that is, the dimension L2 in the left-right direction of the catalyst built-in muffler 30 is equal to or less than the dimension L1 in the left-right direction of the engine body 2. Therefore, the catalyst built-in muffler 30 can be avoided from protruding outward from the engine body 2 in the left-right direction, and the entire engine 1 can be made compact.

In the present embodiment, the inlet portions 41A and 41B are provided near both end portions in the left-right direction of the outer peripheral surface of the case body 41. The exhaust pipe end portions 25A and 25B, that is, the exhaust pipes 20A and 20B are connected to the inlet portions 41A and 41B, respectively. Therefore, the housing case 40 and thus the catalyst built-in muffler 30 can be stably supported by the exhaust pipes 20A and 20B. Therefore, other structures for supporting the catalyst built-in muffler 30 can be simplified or unnecessary. Since the catalyst body 50 is housed inside the housing case 40, the rigidity of the housing case 40 can be enhanced.

In the present embodiment, the inlet portions 41A and 41B are formed on the outer peripheral surface of the case body 41. Therefore, it is possible to prevent an increase in size in the left-right direction of the exhaust system as compared with a case where the inlet portions 41A and 41B are formed at the end portions in the left-right direction of the case body 41 and the exhaust pipes 20A and 20B are connected to them.

In the present embodiment, the communication pipe 49 communicating with the open end 50B on the left side of the catalyst body 50, that is, the one open end 50B in the axial direction thereof extends to the outside of the housing case 40 through the second expansion chamber S2. Then, the exhaust gas having passed through the catalyst body 50 passes through the communication pipe 49 and is led out from the left end portion of the housing case 40, that is, the end portion on one side in the longitudinal direction of the housing case 40. Therefore, as described above, while the catalyst body 50 is disposed between the first expansion chamber S1 and the second expansion chamber S2 in the longitudinal direction of the housing case 40, the exhaust gas in the housing case 40 can be led out to the outside from the end portion on one side in the longitudinal direction of the housing case 40.

In the present embodiment, the catalyst body 50 is supported by the first surrounding wall 45C of the first partition portion 45 including the partition wall 45A defining the first expansion chamber S1 and the catalyst chamber S3, and the second surrounding wall 46C of the second partition portion 46 including the partition wall 46A defining the second expansion chamber S2 and the catalyst chamber S3. Therefore, the number of components can be reduced as compared with a case where a member for defining the expansion chambers S1 and S2 and the catalyst chamber S3 and a member for supporting the catalyst body 50 are individually provided.

In the present embodiment, the exhaust gas flows into the catalyst body 50 after being introduced into the outer peripheral chamber S31 from each of the expansion chambers S1 and S2, and the exhaust gas sensor 70 is attached so as to face the outer peripheral chamber S31. Therefore, the property of the entire exhaust gas flowing into the housing case 40 from each of the exhaust pipes 20A and 20B can be detected by the exhaust gas sensor 70. In particular, in the present embodiment, since the exhaust gas sensor 70 is provided near the point where the exhaust gases introduced from the expansion chambers S1 and S2 to the outer peripheral chamber S31 merge, the property of the entire exhaust gas can be accurately detected.

In the present embodiment, the exhaust gas sensor 70 is disposed between the two head covers 13A and 13B and the two cylinder heads 12A and 12B in the left-right direction. Therefore, interference between the head covers 13A and 13B and the cylinder heads 12A and 12B and the exhaust gas sensor 70 can be avoided.

In the present embodiment, the catalyst built-in muffler 30 has a function of purifying the exhaust gas and a function of reducing the exhaust noise. Therefore, the entire engine can be downsized as compared with a case where devices having these functions are individually provided.

[Modifications]

The position of the catalyst chamber S3 in the housing case 40 is not limited to the above. For example, the catalyst chamber S3 may be disposed in a region excluding a region between the first expansion chamber S1 and the second expansion chamber S2 in the longitudinal direction of the housing case 40.

The volumes of the first expansion chamber S1 and the second expansion chamber S2 only need to be larger than the volume of the catalyst body 50, and the volumes of the first expansion chamber S1 and the second expansion chamber S2 needs not be the same.

The support structure of the catalyst body 50 is not limited to the above. That is, the catalyst body 50 may be supported by a member different from the surrounding walls 45C and 46C. The surrounding walls 45C and 46C can be omitted.

The partition portions 45 and 46 can be omitted. For example, each of the expansion chambers S1 and S2 may be defined inside the housing case 40 by the catalyst body 50 itself.

The positions of the inlet portions 41A and 41B, that is, the connection positions between the housing case 40 and the downstream end portions 25A and 25B of the exhaust pipes 20A and 20B are not limited to the above.

In the above embodiment, the case where the communication pipe 49 is provided and the exhaust gas is led out from the end portion on one side in the longitudinal direction of the housing case 40 has been described, but the position where the exhaust gas is led out from the housing case 40 is not limited to this. The communication pipe 49 may be omitted. For example, the outer peripheral surface of the case body 41 may be provided with an opening, and the exhaust gas may be discharged from the opening.

In the above embodiment, the case where the housing case 40 is provided with the first expansion chamber S1 and the second expansion chamber S2 that cause the first exhaust pipe 20A and the second exhaust pipe 20B to individually communicate has been described, but the housing case 40 may be provided with only one expansion chamber, and both of the exhaust pipes 20A and 20B may communicate with the expansion chamber. The number of exhaust pipes connected to the housing case 40 is not limited to the above, and may be 1 or 3 or more.

In the above embodiment, the case where the flow of the exhaust gas is deflected a plurality of times in the housing case 40 has been described, but the exhaust gas may be deflected only once. Also, it needs not be deflected. That is, the housing case 40 may be configured to deflect the flow of the exhaust gas only once inside the housing case 40. The housing case 40 may be configured such that the flow of the exhaust gas is not deflected inside the housing case 40.

The dimension of the housing case 40, that is, the dimension in the longitudinal direction thereof is not limited to the above. For example, the dimension in the longitudinal direction of the housing case 40 may be larger than the dimension of the engine body 2 in the longitudinal direction of the housing case 40.

The posture of the housing case 40 needs not be a posture extending in the left-right direction, that is, the port array direction.

The position of the catalyst body 50 as viewed along the up-down direction needs not be on the center line XC. That is, the catalyst body 50 may be disposed at a position deviated from the center line XC when viewed from the up-down direction.

The attachment position of the exhaust gas sensor 70 is not limited to the position facing the outer peripheral chamber S31. The exhaust gas sensor 70 is not limited to one that detects the oxygen concentration of the exhaust gas. For example, the exhaust gas sensor 70 may detect an exhaust temperature or the like. The exhaust gas sensor 70 may be omitted.

The engine body 2 is not limited to a V-twin engine. That is, the engine body may be a single-cylinder engine having only one cylinder. The engine may also be an engine having more than two cylinders. The engine body 2 may be an in-line multi-cylinder engine in which a plurality of cylinders are arranged in series.

In a case where the engine body is a multi-cylinder engine, the exhaust gases discharged from the cylinders may be merged on the upstream side of the housing case, and the merged exhaust gas may be introduced into the housing case.

The catalyst built-in muffler 30 may be provided at a position different from the flow path of air sent from the fan 8. The fan 8 may be omitted. An insulator for shielding heat released from the engine body 2 may be provided between the catalyst built-in muffler 30 and the engine body 2.

The central axis of each of the exhaust pipe end portions 25A and 25B needs not intersect the central axis X40 of the case body 41. In the configuration in which these do not intersect, it is possible to reduce the energy of the exhaust gas by swirling the exhaust gas in each of the expansion chambers S1 and S2.

The inlet portions 41A and 41B may be provided on the bottom walls 42 and 43 of the housing case 40. A part for leading out the exhaust gas from the inside of the case body 41 to the outside may be formed at a right end portion of the housing case 40. Furthermore, this part may be provided on the outer peripheral surface of the case body 41. The shapes of the housing case 40 and the case body 41 are not limited to the cylindrical shape. The housing case 40 and the case body 41 may have a tubular shape with an elliptical or rectangular cross-section.

The number and hole diameters of the first communication holes 45D, the second communication holes 46D, and the introduction holes 45E are not limited. A plurality of rows of first communication holes 45D may be formed in the first partition wall 45A in the radial direction of the housing case 40. Similarly, a plurality of rows of second communication holes 46D may be formed in the second partition wall 46A in the radial direction of the housing case 40. When the plurality of first communication holes 45D are formed, the hole diameters of some or all of the first communication holes 45D may be set to be different from one another. Similarly, some or all of the hole diameters of the plurality of second communication holes 46D may be set to be different from one another. Some or all of the hole diameters of the plurality of introduction holes 45E may be set to be different from one another. For example, the flow path resistance may be adjusted to be different between the first communication holes 45D, between the second communication holes 46D, or between the introduction holes 45E by changing the hole diameter or the number in accordance with the speed of the exhaust gas. Specifically, the hole diameter of a hole formed in a part where the speed of the exhaust gas is high may be reduced. The number of holes formed in this part may be reduced.

The mounting posture of the engine 1 on the work machine is not limited to the posture in which the crankshaft line X1 extends in the up-down direction. For example, the engine 1 may be mounted on the work machine in a posture in which the crankshaft line X1 extends in the horizontal direction.

In order to further reduce the exhaust gas noise, a separate silencing device for reducing the exhaust gas noise may be further provided on the exhaust downstream side of the catalyst built-in muffler 30.

SUMMARY

The embodiment and its modifications are summarized as follows.

An exhaust structure for an engine according to one aspect of the present disclosure includes: an exhaust pipe connected to an engine body, the exhaust pipe into which an exhaust gas is introduced from the engine body; a catalyst body that purifies an exhaust gas; and a housing case that houses the catalyst body, in which the housing case includes an inlet portion connected to a downstream end portion of the exhaust pipe, the inlet portion into which an exhaust gas is introduced from the exhaust pipe, an outlet portion that leads out an exhaust gas from the housing case to an outside, and an expansion chamber provided on a more upstream side than the catalyst body in a flow direction of an exhaust gas from the inlet portion toward the outlet portion and having a space defined inside, and a volume of the expansion chamber is larger than a volume of the catalyst body.

According to the present disclosure, the expansion chamber larger in volume than the catalyst body is provided between the downstream end portion of the exhaust pipe and the catalyst body. Therefore, the exhaust gas can be expanded and the temperature thereof can be lowered before the exhaust gas flows into the catalyst body. That is, the temperature of the exhaust gas flowing into the catalyst body can be suppressed low. Therefore, it is possible to suppress the progress of deterioration of the catalyst accompanying the exposure to the high-temperature exhaust gas. The flow velocity of the exhaust gas is reduced by flowing into the expansion chamber having a large volume. When the flow velocity of the exhaust gas is lowered in this manner, it is possible to prevent the catalyst supported on the catalyst body from being peeled off, and the catalyst can also be protected by this.

Preferably, the volume of the expansion chamber is 2 times or more and 10 times or less the volume of the catalyst body.

In this aspect, since the volume of the expansion chamber is secured, the temperature of the exhaust gas can be reliably reduced in the expansion chamber. When the volume of the expansion chamber is less than 2 times the volume of the catalyst body, it is difficult to obtain a sufficient expansion effect, and it is difficult to enhance the protective effect of the catalyst. If the volume of the expansion chamber is more than 10 times the volume of the catalyst body, the housing case becomes large in size, and the mountability of the engine is deteriorated. As described above, by setting the volume of the expansion chamber to be 2 times or more and 10 times or less the volume of the catalyst body, it is possible to achieve both protection of the catalyst and prevention of an increase in volume. When the volume of the expansion chamber is 2.5 times or more, more preferably 3 times or more and 5 times or less the volume of the catalyst body, the effects of protection of the catalyst and prevention of an increase in volume can be enhanced.

Preferably, the housing case has a tubular shape extending in a predetermined direction, the inlet portion includes a first inlet portion and a second inlet portion, the expansion chamber includes a first expansion chamber provided on one side in a longitudinal direction of the housing case and communicating with the first inlet portion, and a second expansion chamber provided on another side in the longitudinal direction of the housing case and communicating with the second inlet portion, and the catalyst body is housed between the first expansion chamber and the second expansion chamber in the longitudinal direction of the housing case.

According to this aspect, it is possible to introduce the exhaust gases into the catalyst body after expanding and lowering in temperature both the exhaust gases flowing from different inlet portions, and it is possible to suppress the progress of deterioration of the catalyst body. Since the catalyst body is disposed at the center in the longitudinal direction of the housing case, the weight balance of the housing case incorporating the catalyst body can be improved.

Preferably, the outlet portion is provided at an end portion on one side in the longitudinal direction of the housing case, the catalyst body has a tubular shape extending along the longitudinal direction of the housing case, and the housing case includes a lead-out pipe that causes one open end of the catalyst body and the outlet portion to communicate through the second expansion chamber.

According to this aspect, the exhaust gas having passed through the catalyst body can be led out from the end portion of the catalyst body while the catalyst body is disposed at the center in the longitudinal direction of the housing case.

Preferably, the housing case includes a catalyst chamber provided between the first expansion chamber and the second expansion chamber and housing the catalyst body, a first partition portion defining the first expansion chamber and the catalyst chamber, and a second partition portion defining the second expansion chamber and the catalyst chamber, the catalyst body is disposed inside the catalyst chamber so that a space is defined around the catalyst body, in the first partition portion, a first communication hole causing an outer peripheral chamber defined on an outer periphery of the catalyst body in the catalyst chamber and the first expansion chamber to communicate is formed, and in the second partition portion, a second communication hole causing the outer peripheral chamber and the second expansion chamber to communicate is formed.

According to this aspect, the energy of the exhaust gas can be consumed by passing through each communication hole, and the pressure and flow velocity of the exhaust gas can be reduced before the exhaust gas flows into the catalyst body.

Preferably, the housing case is attached with an exhaust gas sensor that detects a property of the exhaust gas so as to face the outer peripheral chamber.

According to this aspect, the property of the entire exhaust gas flowing into the inside of the housing case from each inlet portion can be detected.

Preferably, a flow path area of an exhaust gas at an upstream end portion of the expansion chamber is 2 times or more a flow path area of an exhaust gas at a downstream end portion of the exhaust pipe.

According to this aspect, the exhaust gas can be expanded and reduced in temperature in the expansion chamber.

Preferably, the housing case includes a catalyst chamber housing the catalyst body, and a partition portion defining the catalyst chamber and the expansion chamber, and a communication hole communicating the catalyst chamber and the expansion chamber is formed in the partition portion.

According to this aspect, the pressure and temperature of the exhaust gas can be lowered by passing the exhaust gas through the communication hole, and the exhaust gas having a lower temperature can be introduced into the catalyst body.

Preferably, the catalyst body is supported by the partition portion.

According to this aspect, a member for supporting the catalyst body needs not be provided separately from the partition portion, and the number of components can be reduced.

Preferably, the catalyst body has a tubular shape, and the communication hole is formed in a region of the partition portion excluding a region facing an open end of the catalyst body.

In this aspect, the flow direction of the exhaust gas is changed from the communication hole to the catalyst body. Therefore, the energy of the exhaust gas can be reduced by collision between the exhaust gas and the inner surface of the housing case. Therefore, the flow velocity of the exhaust gas flowing into the catalyst body can be reduced.

Preferably, the housing case has a tubular shape, a downstream end portion of the exhaust pipe extends in a direction intersecting an axial direction of the housing case, the partition portion includes a partition wall defining the expansion chamber and the catalyst chamber in the axial direction of the housing case, and a surrounding wall that has a tubular shape extending from the partition wall along the axial direction of the housing case and surrounds an upstream end portion of the catalyst body, the communication hole is formed on a more outer peripheral side than the surrounding wall of the partition portion and penetrates the partition wall in the axial direction of the housing case, and an introduction hole penetrating the surrounding wall in a radial direction of the housing case is formed in the surrounding wall.

In this aspect, the flow direction of the exhaust gas is changed among a period from when the exhaust gas flows into the housing case through the downstream end portion of the exhaust pipe to when the exhaust gas passes through the communication hole, a period from when the exhaust gas passes through the communication hole to when the exhaust gas passes through the introduction hole, and a period from when the exhaust gas passes through the introduction hole to when the exhaust gas flows into the upstream end portion of the catalyst body. Therefore, it is possible to further reduce the flow velocity of the exhaust gas flowing into the catalyst body by causing the exhaust gas to collide with the inner surfaces of the expansion chamber and the catalyst chamber and the surrounding walls.

Preferably, the housing case is configured such that an exhaust gas flow is deflected on a more upstream side than the catalyst body.

According to this aspect, the flow velocity of the exhaust gas flowing into the catalyst body can be further reduced by collision between the exhaust gas and the wall surface or the like at the time of deflection.

Preferably, the housing case is configured such that the exhaust gas flow is deflected a plurality of times on the more upstream side than the catalyst body.

According to this aspect, since the collision between the exhaust gas and the wall surface or the like at the time of deflection is performed a plurality of times, the flow velocity of the exhaust gas flowing into the catalyst body can be further reduced.

An engine according to one aspect of the present disclosure includes: an exhaust pipe connected to the engine body, the exhaust pipe into which an exhaust gas is introduced from the engine body; a catalyst body that purifies an exhaust gas; and a housing case that houses the catalyst body, in which the housing case includes an inlet portion connected to a downstream end portion of the exhaust pipe, the inlet portion into which an exhaust gas is introduced from the exhaust pipe, an outlet portion that leads out an exhaust gas from the housing case to an outside, and an expansion chamber provided on a more upstream side than the catalyst body in a flow direction of an exhaust gas from the inlet portion toward the outlet portion and having a space defined inside, and a volume of the expansion chamber is larger than a volume of the catalyst body.

According to the engine according to the present disclosure, the expansion chamber larger in volume than the catalyst body is provided between the downstream end portion of the exhaust pipe and the catalyst body. Therefore, the exhaust gas can be expanded and the temperature thereof can be lowered before the exhaust gas flows into the catalyst body. That is, the temperature of the exhaust gas flowing into the catalyst body can be suppressed low. Therefore, it is possible to suppress the progress of deterioration of the catalyst accompanying the exposure to the high-temperature exhaust gas.

Preferably, the housing case has a shape extending in a predetermined direction, and a dimension in a longitudinal direction of the housing case is equal to or less than a dimension of the engine body in the longitudinal direction of the housing case.

According to this aspect, the housing case is avoided from protruding from the engine body in the predetermined direction, and the entire engine is made compact.

Preferably, the housing case has a shape extending in a predetermined direction, the inlet portion includes a first inlet portion and a second inlet portion, the expansion chamber includes a first expansion chamber provided on one side in a longitudinal direction of the housing case and communicating with the first inlet portion, and a second expansion chamber provided on another side in the longitudinal direction of the housing case and communicating with the second inlet portion, and the catalyst body is housed between the first expansion chamber and the second expansion chamber in the longitudinal direction of the housing case.

According to this aspect, it is possible to introduce the exhaust gases into the catalyst body after expanding and lowering in temperature both the exhaust gases flowing from different inlet portions, and it is possible to suppress the progress of deterioration of the catalyst body. Since the catalyst body is disposed at the center in the longitudinal direction of the housing case, the weight balance of the housing case incorporating the catalyst body can be improved.

Preferably, the engine body includes a first piston that reciprocates in a first cylinder, a second piston that reciprocates in a second cylinder, and a crankshaft that is rotationally driven by the first piston and the second piston, the exhaust pipe includes a first exhaust pipe that is connected to the first inlet portion and introduces an exhaust gas from the first cylinder into the first expansion chamber, and a second exhaust pipe that is connected to the second inlet portion and introduces an exhaust gas from the second cylinder into the second expansion chamber, the first cylinder and the second cylinder are arranged such that, when viewed along a crankshaft line that is a central axis of the crankshaft, a first cylinder axis line that is a central axis of the first cylinder and a second cylinder axis line that is a central axis of the second cylinder intersect each other, and the catalyst body is arranged at a center in the longitudinal direction of the housing case and on a line that equally divides an angle formed by the first cylinder axis line and the second cylinder axis line in a state of being viewed along the crankshaft line.

In this aspect, the catalyst body is disposed at a position substantially equidistant from both the first cylinder and the second cylinder. That is, the catalyst body is disposed at a position separated from both the first cylinder and the second cylinder by substantially the same distance. Therefore, the heat that the catalyst body receives from the first cylinder and the second cylinder can be suppressed to be small, and the progress of the deterioration of the catalyst body can be suppressed.

The crankshaft line may be a line extending in an up-down direction.

Preferably, the engine includes a fan that sends air to the engine body, in which the housing case is disposed in a flow path of air sent from the fan.

According to this aspect, since the housing case is cooled by the air sent from the fan, the progress of deterioration of the catalyst can be suppressed.

The invention claimed is:
1. An exhaust structure for an engine comprising:
an exhaust pipe connected to an engine body, the exhaust pipe into which an exhaust gas is introduced from the engine body;
a catalyst body that purifies an exhaust gas; and
a housing case that houses the catalyst body,
wherein:
the housing case has a tubular shape extending in a predetermined direction,
the housing case includes:
an inlet portion connected to a downstream end portion of the exhaust pipe, the inlet portion into which an exhaust gas is introduced from the exhaust pipe;
an outlet portion that leads out an exhaust gas from the housing case to an outside;
an expansion chamber on a more upstream side than the catalyst body in a flow direction of an exhaust gas from the inlet portion toward the outlet portion and having a space defined inside;
a catalyst chamber housing the catalyst body;
a first partition portion; and
a second partition portion,
the inlet portion includes a first inlet portion and a second inlet portion,
the catalyst body is disposed inside the catalyst chamber so that a space is defined around the catalyst body,
the expansion chamber includes a first expansion chamber on one side in a longitudinal direction of the housing case and communicating with the first inlet portion, and a second expansion chamber on another side in the longitudinal direction of the housing case and communicating with the second inlet portion,
the catalyst chamber is between the first expansion chamber and the second expansion chamber,
the first partition portion defines the first expansion chamber and the catalyst chamber,
the second partition portion defines the second expansion chamber and the catalyst chamber,
a first communication hole causing an outer peripheral chamber defined on an outer periphery of the catalyst body in the catalyst chamber and the first expansion chamber to communicate is in the first partition portion,
a second communication hole causing the outer peripheral chamber and the second expansion chamber to communicate is in the second partition portion, and
a volume of the expansion chamber is larger than a volume of the catalyst body.
2. The exhaust structure for an engine according to claim 1, wherein:
the volume of the expansion chamber is 2 times or more and 10 times or less the volume of the catalyst body.
3. The exhaust structure for an engine according to claim 1, wherein:
the outlet portion is at an end portion on one side in the longitudinal direction of the housing case,
the catalyst body has a tubular shape extending along the longitudinal direction of the housing case, and
the housing case includes a lead-out pipe that causes one open end of the catalyst body and the outlet portion to communicate through the second expansion chamber.
4. The exhaust structure for an engine according to claim 1, wherein:

the housing case is attached with an exhaust gas sensor that detects a property of the exhaust gas so as to face the outer peripheral chamber.
5. The exhaust structure for an engine according to claim 1, wherein:
a flow path area of an exhaust gas at an upstream end portion of the expansion chamber is 2 times or more a flow path area of an exhaust gas at the downstream end portion of the exhaust pipe.
6. The exhaust structure for an engine according to claim 1, wherein:
the housing case is configured such that an exhaust gas flow is deflected on a more upstream side than the catalyst body.
7. The exhaust structure for an engine according to claim 6, wherein:
the housing case is configured such that the exhaust gas flow is deflected a plurality of times on the more upstream side than the catalyst body.
8. An exhaust structure for an engine, comprising:
an exhaust pipe connected to an engine body, the exhaust pipe into which an exhaust gas is introduced from the engine body;
a catalyst body that purifies an exhaust gas; and
a housing case that houses the catalyst body,
wherein:
the housing case has a tubular shape,
the housing case includes:
an inlet portion connected to a downstream end portion of the exhaust pipe, the inlet portion into which an exhaust gas is introduced from the exhaust pipe;
an outlet portion that leads out an exhaust gas from the housing case to an outside;
an expansion chamber on a more upstream side than the catalyst body in a flow direction of an exhaust gas from the inlet portion toward the outlet portion and having a space defined inside;
a catalyst chamber housing the catalyst body; and
a partition portion defining the catalyst chamber and the expansion chamber,
the downstream end portion of the exhaust pipe extends in a direction intersecting an axial direction of the housing case,
the partition portion includes a partition wall defining the expansion chamber and the catalyst chamber in the axial direction of the housing case, and a surrounding wall that has a tubular shape extending from the partition wall along the axial direction of the housing case and surrounds an upstream end portion of the catalyst body,
the partition portion includes a communication hole communicating the catalyst chamber and the expansion chamber,
the communication hole is on a more outer peripheral side than the surrounding wall of the partition portion and penetrates the partition wall in the axial direction of the housing case, and
the surrounding wall includes an introduction hole penetrating the surrounding wall in a radial direction of the housing case, and
a volume of the expansion chamber is larger than a volume of the catalyst body.
9. The exhaust structure for an engine according to claim 8, wherein:
the catalyst body is supported by the partition portion.
10. The exhaust structure for an engine according to claim 8, wherein:

the catalyst body has a tubular shape, and the communication hole is in a region of the partition portion excluding a region facing an open end of the catalyst body.

11. An engine comprising:

an engine body including a first cylinder and a second cylinder;

an exhaust pipe connected to the engine body, the exhaust pipe into which an exhaust gas is introduced from the engine body;

a catalyst body that purifies an exhaust gas; and a housing case that houses the catalyst body, wherein:

the housing case has a shape extending in a predetermined direction and includes an inlet portion connected to a downstream end portion of the exhaust pipe, the inlet portion into which an exhaust gas is introduced from the exhaust pipe, an outlet portion that leads out an exhaust gas from the housing case to an outside, and an expansion chamber on a more upstream side than the catalyst body in a flow direction of an exhaust gas from the inlet portion toward the outlet portion and having a space defined inside, the inlet portion includes a first inlet portion and a second inlet portion, the expansion chamber includes a first expansion chamber on one side in a longitudinal direction of the housing case and communicating with the first inlet portion, and a second expansion chamber on another side in the longitudinal direction of the housing case and communicating with the second inlet portion, the catalyst body is housed between the first expansion chamber and the second expansion chamber in the longitudinal direction of the housing case, and a volume of the expansion chamber is larger than a volume of the catalyst body, wherein:

the engine body includes a first piston that reciprocates in the first cylinder, a second piston that reciprocates in the second cylinder, and a crankshaft that is rotationally driven by the first piston and the second piston, the exhaust pipe includes a first exhaust pipe that is connected to the first inlet portion and introduces an exhaust gas from the first cylinder into the first expansion chamber, and a second exhaust pipe that is connected to the second inlet portion and introduces an exhaust gas from the second cylinder into the second expansion chamber, the first cylinder and the second cylinder are disposed such that, when viewed along a crankshaft line that is a central axis of the crankshaft, a first cylinder axis line that is a central axis of the first cylinder and a second cylinder axis line that is a central axis of the second cylinder intersect each other, and the catalyst body is at a center in the longitudinal direction of the housing case and on a line that equally divides an angle formed by the first cylinder axis line and the second cylinder axis line in a state of being viewed along the crankshaft line.

12. The engine according to claim 11, wherein:

the housing case has a shape extending in a predetermined direction, and a dimension in a longitudinal direction of the housing case is equal to or less than a dimension of the engine body in the longitudinal direction of the housing case.

13. The engine according to claim 11, wherein:

the crankshaft line extends in an up-down direction.

14. An engine, comprising:

an engine body including a cylinder;

an exhaust pipe connected to the engine body, the exhaust pipe into which an exhaust gas is introduced from the engine body;

a catalyst body that purifies an exhaust gas; and a housing case that houses the catalyst body, wherein:

the housing case has a shape extending in a predetermined direction and includes an inlet portion connected to a downstream end portion of the exhaust pipe, the inlet portion into which an exhaust gas is introduced from the exhaust pipe, an outlet portion that leads out an exhaust gas from the housing case to an outside, and an expansion chamber on a more upstream side than the catalyst body in a flow direction of an exhaust gas from the inlet portion toward the outlet portion and having a space defined inside, the inlet portion includes a first inlet portion and a second inlet portion, the expansion chamber includes a first expansion chamber on one side in a longitudinal direction of the housing case and communicating with the first inlet portion, and a second expansion chamber on another side in the longitudinal direction of the housing case and communicating with the second inlet portion, the catalyst body is housed between the first expansion chamber and the second expansion chamber in the longitudinal direction of the housing case, and a volume of the expansion chamber is larger than a volume of the catalyst body, the engine further comprising a fan to send air to the engine body, wherein the housing case is disposed in a flow path of air sent from the fan.

* * * * *